US012518160B2

(12) United States Patent
Baker

(10) Patent No.: US 12,518,160 B2
(45) Date of Patent: Jan. 6, 2026

(54) SELECTIVE TRAINING OF DEEP LEARNING MODULES

(71) Applicant: D5AI LLC, Maitland, FL (US)

(72) Inventor: James K. Baker, Maitland, FL (US)

(73) Assignee: D5AI LLC, Maitland, FL (US)

( * ) Notice: Subject to any disclaimer, the term of this patent is extended or adjusted under 35 U.S.C. 154(b) by 0 days.

(21) Appl. No.: 17/753,727

(22) PCT Filed: Sep. 9, 2020

(86) PCT No.: PCT/US2020/049911
§ 371 (c)(1),
(2) Date: Mar. 11, 2022

(87) PCT Pub. No.: WO2021/061401
PCT Pub. Date: Apr. 1, 2021

(65) Prior Publication Data
US 2022/0383111 A1     Dec. 1, 2022

Related U.S. Application Data

(60) Provisional application No. 62/906,971, filed on Sep. 27, 2019.

(51) Int. Cl.
*G06N 3/08* (2023.01)
(52) U.S. Cl.
CPC ..................... *G06N 3/08* (2013.01)
(58) Field of Classification Search
CPC ........................................ G06N 3/08
See application file for complete search history.

(56) References Cited

U.S. PATENT DOCUMENTS

| 6,581,048 | B1 | 6/2003 | Werbos |
| 8,805,653 | B2* | 8/2014 | Huh ................. G06V 40/169 |
| | | | 703/2 |
| 10,832,137 | B2 | 11/2020 | Baker et al. |

(Continued)

FOREIGN PATENT DOCUMENTS

WO          97/29447 A2     8/1997
WO    WO-2017158058 A1 *  9/2017  ........... G05D 1/0088

(Continued)

OTHER PUBLICATIONS

Wang et al. (Data Dropout: Optimizing Training Data for Convolutional Neural Networks, Nov. 2018, pp. 39-46) (Year: 2018).*

(Continued)

*Primary Examiner* — George Giroux
(74) *Attorney, Agent, or Firm* — K&L Gates LLP

(57) ABSTRACT

Machine-learning computer system breaks a neural network into a plurality of modules and tracks the training process module-by-module and datum-by-datum, recording auxiliary information during one iteration of the training process for retrieval during a later iteration. Based on this auxiliary information, the computer system can make decisions that can greatly reduce the amount of computation required by the training process. The auxiliary information allows the computer system to diagnose and fix problems that occur during the training process on a module-by-module and/or datum-by-datum basis.

79 Claims, 12 Drawing Sheets

(56) References Cited

U.S. PATENT DOCUMENTS

| | | | |
|---|---|---|---|
| 10,929,757 B2 | 2/2021 | Baker et al. | |
| 10,956,818 B2* | 3/2021 | Baker | G06N 3/082 |
| 11,151,455 B2 | 10/2021 | Baker et al. | |
| 11,195,097 B2 | 12/2021 | Baker et al. | |
| 2011/0299765 A1* | 12/2011 | Baker | G06F 18/217 |
| | | | 382/224 |
| 2015/0133025 A1 | 5/2015 | Ponomarev et al. | |
| 2018/0246967 A1 | 8/2018 | Hill et al. | |
| 2018/0356771 A1* | 12/2018 | Basu | G05B 13/04 |
| 2020/0090045 A1 | 3/2020 | Baker | |
| 2020/0184337 A1 | 6/2020 | Baker | |
| 2020/0210812 A1 | 7/2020 | Baker | |
| 2020/0311572 A1 | 10/2020 | Baker | |
| 2020/0327414 A1 | 10/2020 | Baker et al. | |
| 2020/0342318 A1 | 10/2020 | Baker et al. | |
| 2020/0349446 A1 | 11/2020 | Baker et al. | |
| 2020/0356861 A1 | 11/2020 | Baker et al. | |
| 2020/0364545 A1* | 11/2020 | Shattil | G06N 3/04 |
| 2020/0364625 A1 | 11/2020 | Baker et al. | |
| 2020/0401869 A1 | 12/2020 | Baker et al. | |
| 2021/0027163 A1 | 1/2021 | Baker et al. | |
| 2022/0058467 A1 | 2/2022 | Baker et al. | |

FOREIGN PATENT DOCUMENTS

| | | | |
|---|---|---|---|
| WO | 2018/156942 A1 | 8/2018 | |
| WO | 2018/175098 A1 | 9/2018 | |
| WO | 2018/194960 A1 | 10/2018 | |
| WO | 2018/226492 A1 | 12/2018 | |
| WO | 2019/152308 A1 | 8/2019 | |
| WO | 2020/009881 A1 | 1/2020 | |
| WO | 2020/018279 A1 | 1/2020 | |
| WO | 2020/036847 A1 | 2/2020 | |
| WO | 2020/041026 A1 | 2/2020 | |
| WO | 2020/046721 A1 | 3/2020 | |
| WO | 2021/040944 A1 | 3/2021 | |
| WO | 2021/194516 A1 | 9/2021 | |

OTHER PUBLICATIONS

Kubo et al. (Compacting Neural Network Classifiers via Dropout Training, May 2017, pp. 1-8) (Year: 2017).*

Manning et al. (Fast dropout training, 2013, pp. 1-9) (Year: 2013).*

Sun et al. (Training Simplification and Model Simplification for Deep Learning: A Minimal Effort Back Propagation Method, Nov. 2017, pp. 1-13) (Year: 2017).*

Feindt et al. (The NeuroBayes neural network package, Dec. 2005, pp. 190-194) (Year: 2005).*

Keshari et al. (Guided Dropout, Dec. 2018, pp. 1-8) (Year: 2018).*

Poernomo et al. (Biased Dropout and Crossmap Dropout: Learning towards effective Dropout regularization in convolutional neural network, Apr. 2018, pp. 61-67) (Year: 2018).*

Van Grinsven et al. (Fast Convolutional Neural Network Training Using Selective Data Sampling: Application to Hemorrhage Detection in Color Fundus Images, May 2016, pp. 1273-1284) (Year: 2016).*

Labach et al. (Survey of Dropout Methods for Deep Neural Networks, Apr. 2019, pp. 1-11) (Year: 2019).*

Gomez et al. (Targeted Dropout, Dec. 2018, pp. 1-8) (Year: 2018).*

Yim et al. (Enhancing the Performance of Convolutional Neural Networks on Quality Degraded Datasets, 2017, pp. 1-8) (Year: 2017).*

Amari (Backpropagation and stochastic gradient descent method, 1992, pp. 185-196) (Year: 1992).*

Baird (Reinforcement Learning Through Gradient Descent, 1999, pp. 0-76) (Year: 1999).*

Munos et al. (Gradient Descent Approaches to Neural-Net-Based Solutions of the Hamilton-Jacobi-Bellman Equation, 1999, pp. 2152-2157) (Year: 1999).*

Chen et al. (Efficient and Robust Parallel DNN Training through Model Parallelism on Multi-GPU Platform, Apr. 2019, pp. 1-11) (Year: 2019).*

Miranda et al. (Reducing the Training Time of Neural Networks by Partitioning, Jan. 2016, pp. 1-10) (Year: 2016).*

Mirhoseini et al. (Device Placement Optimization with Reinforcement Learning, Jun. 2017, pp. 1-10) (Year: 2017).*

Seike et al. (On Parallelizability of Stochastic Gradient Descent for Speech DNNs, May 2014, pp. 235-239) (Year: 2014).*

International Search Report and Written Opinion of the International Searching Authority for International Application No. PCT/US2020/049911 mailed Jan. 27, 2021.

Zoph et al., "Neural Architecture Search with Reinforcement Learning", Google Brain Residency Program; Feb. 15, 2017, https://arxiv.org/pdf/1611.01578.pdf, 16 pages.

Ishii, Masato, "Semi-supervised learning by selective training with pseudo labels via confidence estimation", R&D Center, Sony Corporation, Osaki, Tokyo 141-8610, Japan, ArXiv abs/2103.08193, Computer Science, Mar. 15, 2021, 14 pages.

Mendonça et al., Data Selective Deep Neural Networks For Image Classification, 29th European Signal Processing Conference (EUSIPCO), Aug. 2021, pp. 1376-1380.

Mourad et al., Online Selective Training for Faster Neural Network Learning, 2019 IEEE Data Science Workshop (DSW), Jun. 2019, pp. 135-139.

* cited by examiner

SELECTIVE TRAINING OF DEEP LEARNING MODULES

PRIORITY CLAIM

The present application is a national stage application under 35 U.S.C. § 371 of PCT Application No. PCT/US20/49911, filed Sep. 9, 2020, which claims priority to U.S. provisional patent application Ser. No. 62/906,971, filed Sep. 27, 2019, which is incorporated herein by reference in its entirety.

BACKGROUND

Machine learning systems, especially deep neural networks, have had some remarkable successes in recent years in classification problems in artificial intelligence. There has also been significant progress in implementing the training of deep neural networks to run efficiently, such as in parallel processing on graphics processing units (GPUs). However, difficult classification problems require large neural networks, and large neural networks require large amounts of training data and many epochs of iterative training. Thus, the required amount of computation time to train a large neural network remains a significant barrier to further progress in developing the technology of artificial intelligence.

SUMMARY

The present invention, in one general aspect, is directed to a machine-learning computer system that breaks a neural network into a plurality of modules and tracks the training process module-by-module and datum-by-datum, recording auxiliary information during one epoch of the training process for retrieval during a later epoch. Based on this auxiliary information, the computer system can make decisions that can greatly reduce the amount of computation required by the training process. In addition, auxiliary information allows the computer system to diagnose and fix problems that occur during the training process on a module-by-module and datum-by-datum basis, which can be much more efficient than applying a remedy in a one-size-fits-all manner to the entire network. The computer can fix a problem of overfitting in one module by stopping training early in that specific module, while allowing training to continue in other modules. A module can be trained as a stand-alone network, making it much easier to interpret its output than to interpret the internal nodes in a large monolithic network. Further, the network can include a specialized error correction module comprising an error judgment node, which can give the network a capability of introspection to reduce the error rate while increasing interpretability. The error judgment introspection may be applied on a module-by-module basis, correcting errors that are internal to the parent network and further increasing interpretability.

The presently described systems and methods for selectively training deep learning modules can fix issues arising with overfitting of a machine learning model during training, without being forced to halt the training of the entire machine learning model, which can in turn allow the machine learning model to continue to improve its performance without necessarily overfitting to the training data. The presently described systems and methods can also save computation time and effort, which can allow machine learning models to be trained faster and more efficiently.

These and other benefits of the present invention will be apparent from the description that follows.

FIGURES

Various embodiments of the present invention are described herein by way of example in connection with the following figures, wherein.

DESCRIPTION

Figure 3:
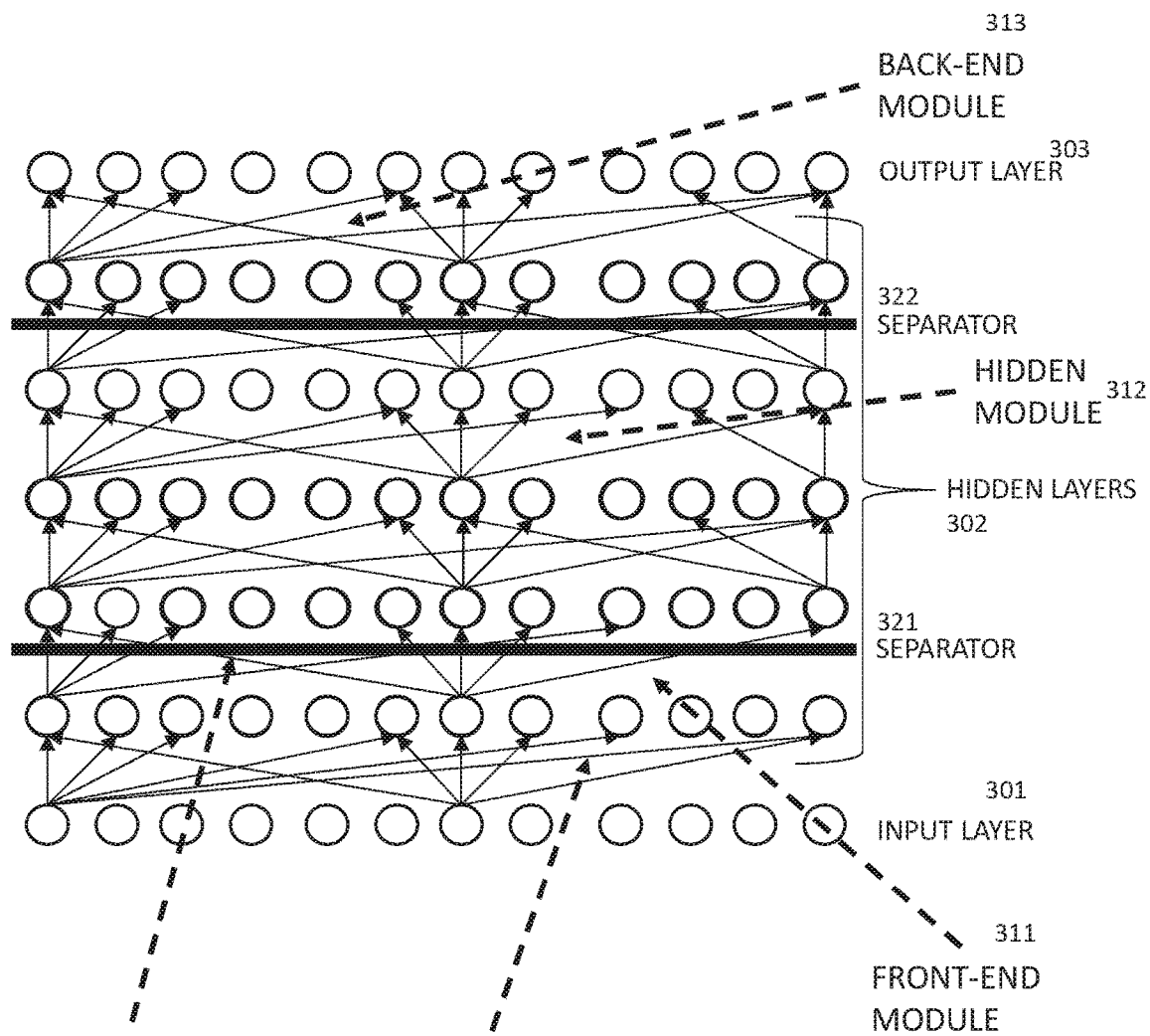
FIG. 3 is a diagram of an example of a deep neural network divided into modules.

Mathematically, a feed-forward neural network may be an arbitrary directed acyclic graph. When organized into layers, each directed arc goes from its source node to a destination node that is in a "higher" layer, where "higher" refers to a network drawn with the input at the bottom and the output at the top. It is also common to draw a network with the directed arcs proceeding from left to right, in which case the "higher" layer is further to the right in the diagram. Typically, a numerical value (called the "bias") is associated with each non-input node and a numerical value (called the "weight") is associated with each directed arc. Training of the neural network comprises computing values for these biases and weights (collectively called the "learned parameters") to achieve an optimum value for a specified objective. Each non-input node j is associated with a specified activation function. Typically, the activation function has the form $act(j)=f(z_j)=f(\Sigma_i w_{i,j} act(i))$, where the sum is over all nodes i such that there is a directed arc with source node i and destination node j, and $w_{i,j}$ is the weight associated with that arc. Some nodes have a different form of activation function such as $at(j)=\max_i(act(i))$. A set of nodes, called a "softmax" set may have interdependent activations of the form $act(j)=\exp(z_j)/\Sigma_k \exp(z_k)$, where $z_k=\Sigma_i act(i)$. An illustrative example of a neural networks is shown in FIG. 3.

To facilitate computation, other forms of networks, such as recurrent neural networks (RNNs) are often converted, explicitly or implicitly, into an approximately equivalent feed-forward network.

Typically, the training of a feed-forward neural network is based on stochastic gradient descent, which is well known to those skilled in the art of training neural networks. Stochastic gradient descent is a stochastic approximation to gradient descent. It is an iterative process in which the training data is broken into batches (called "mini batches") with one update per mini batch of the learned parameters based on an estimate of the negative gradient of the objective function to be minimized (also called the "error-loss function"). The gradient estimate for a mini-batch is computed by accumulating an estimate of the gradient for each datum in the mini-batch. For each datum in the mini batch the computation comprises: (1) a forward computation of the activation value of each node for the given datum; (2) a backward computation (called "back propagation") of the partial derivatives of an objective function; (3) the accumulation of estimates of the partial derivatives of the objective function summed over all data in a mini batch; and (4) an iterative update of the learned parameters with an update done for each mini batch.

In a typical representation, a feed-forward neural network is a network comprising multiple layers of nodes, comprising an input layer, an output layer, and zero or more inner layers (also called "hidden" layers). A feed-forward neural network further comprises a set of directed arcs, each arc connecting a first node (the "source" node of the arc) to a second node (the "destination" node of the arc).

The term "module" is defined herein to be: "a connected subnetwork of a neural network (called the parent network of the module) comprising one or more nodes and arcs connected to the nodes." A module may be a single node or it may be an entire neural network, comprising an input layer, an output layer, and zero or more hidden layers. Accordingly, various types of modules described herein can include single-node modules, multinode modules, single-layer modules, and multilayer modules.

The following description has set forth aspects of computer-implemented devices and/or processes via the use of block diagrams, flowcharts, and/or examples, which may contain one or more functions and/or operations. As used herein, the terms "step" or "block" in the block diagrams and flowcharts refers to a step of a computer-implemented process executed by a computer system, which may be implemented as a machine learning system or an assembly of machine learning systems. Accordingly, each step or block can be embodied as a set of computer executable instructions stored in the memory of a computer system that, when executed by a processor of the computer system, cause the computer system to perform the described function(s). Each block can be implemented as either a machine learning system or as a nonmachine learning system, according to the function described in association with each particular block. Furthermore, each block can refer to one of multiple steps of a process embodied by computer-implemented instructions executed by a computer system (which may include, in whole or in part, a machine learning system) or an individual computer system (which may include, e.g., a machine learning system) executing the described step, which is in turn connected with other computer systems (which may include, e.g., additional machine learning systems) for executing the overarching process described in connection with each figure or figures.

Figure 1:
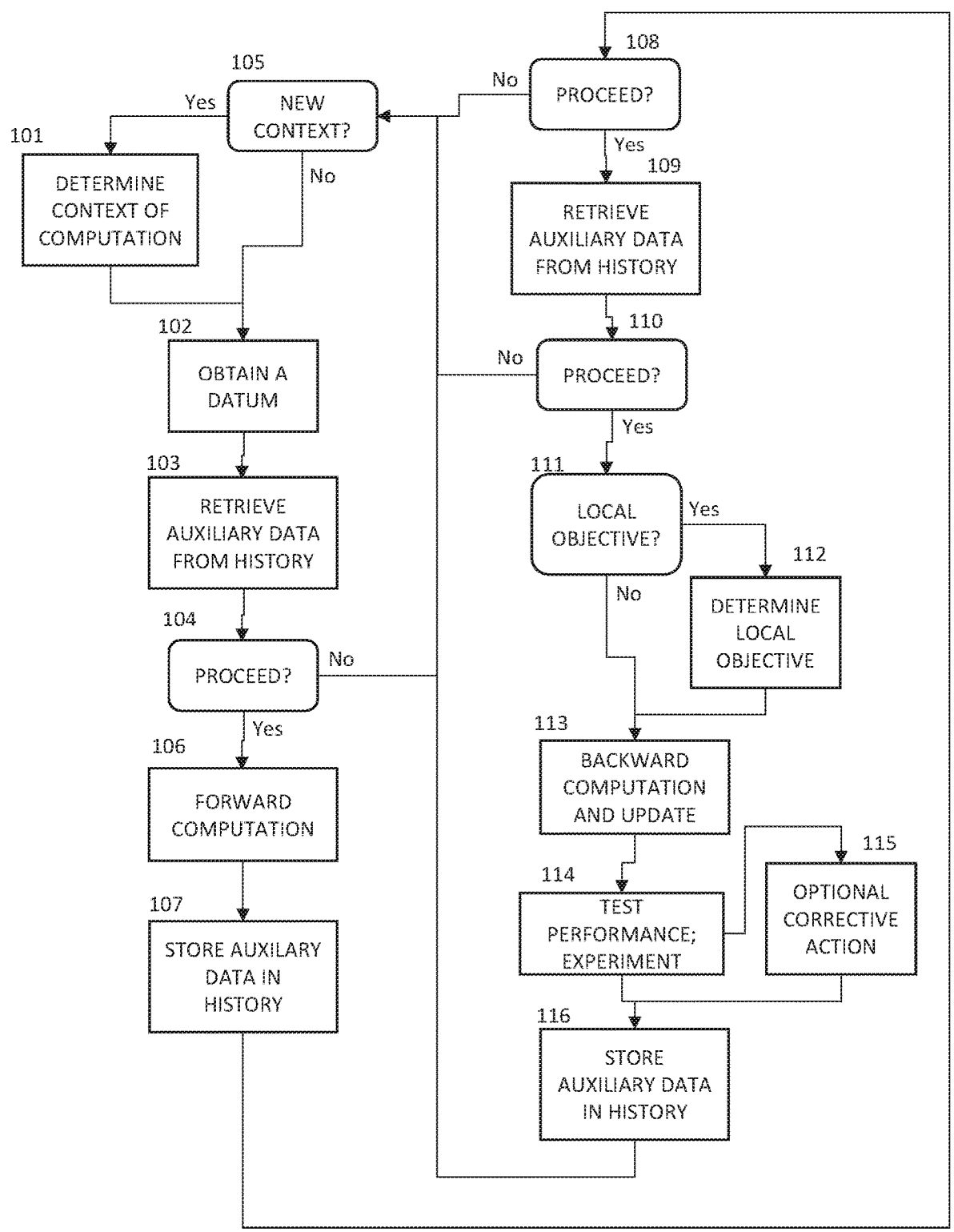
FIG. 1 is a flow chart of an illustrative process of training a module, in accordance with at least one aspect of the present disclosure.

FIG. 1 is an illustrative embodiment of a process for training a module of a network, in accordance with at least one aspect of the present disclosure.

Figure 2:
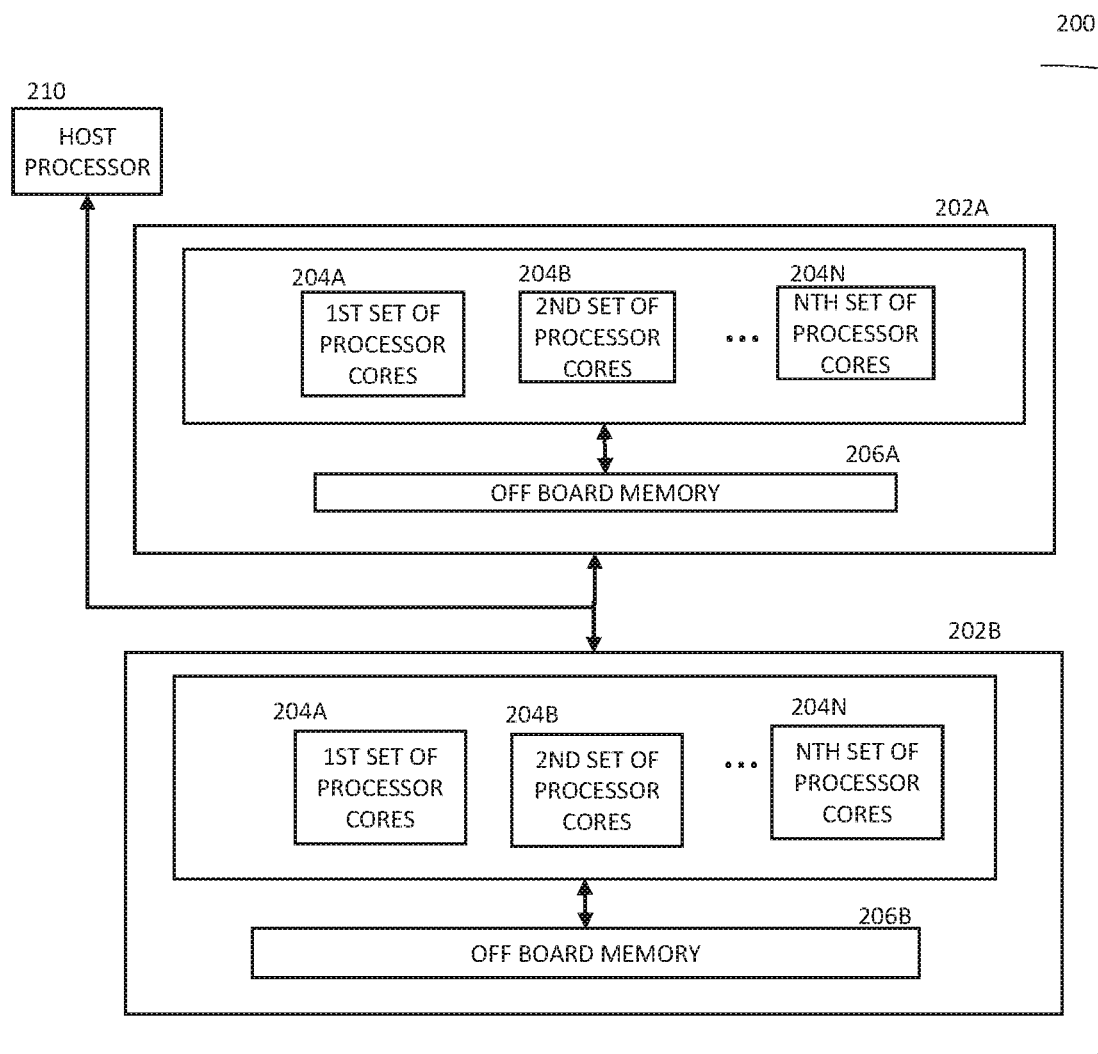
FIG. 2 is a diagram of a multi-processor computer that may be used to implement various embodiments of the invention.

The module training process illustrated in FIG. 1 may be implemented on a computer system, such as computer system 200 illustrated in FIG. 2. Computer system 200 may perform the illustrated training process on a plurality of modules simultaneously. Computer system 200 may build a plurality of neural networks from various combinations of modules, potentially representing exponentially many distinct neural networks.

In some embodiments, an aspect of the process illustrated in FIG. 1 is for computer system 200 to make decisions in steps 104, 108 and 110 that may save computation. In various embodiments of the invention, there may be a substantial enhancement in the amount of computation savings achieved by computer system 200 by making these decisions on a module-by-module basis and on a datum-by-datum basis.

Another aspect of the invention is that computer system 200 may process each datum many times, retaining and using auxiliary information from previous passes of processing. During training by stochastic gradient descent, for example, each datum may be processed for each of millions of epochs of training. During development testing, especially development testing automated with the assistant of a learning coach, computer system 200 may perform repeated testing during the training process. For example, in testing for overfitting on a module-by-module basis, computer system 200 may conduct thousands of tests.

A learning coach is a second machine learning system that is trained to assist in the training of a first machine learning system. A learning coach is trained to improve the learning process and, in some embodiments, to automate decisions that might otherwise need to be made by the system developer. For example, in the embodiment illustrated in FIG. 1, computer system 200 may use a learning coach to assist in the decisions made in steps 104, 108 or 110. In some embodiments, a learning coach may conduct tests based on development data that has been set aside from the training data. Because a learning coach is not learning to recognize the patterns being recognized by the first machine learning system, but rather is learning to emulate a human developer in guiding the learning process, the learning coach may be trained on, or conduct performance tests based on, development data.

Computer system 200 may use a learning coach to assist in estimating statistical parameters to be stored as part of the auxiliary data history in steps 107 and 115. Learning coaches are described in more detail in the following published International patent applications, which are incorporated herein by reference in their entirety: WO/2018/063840 A1, published Apr. 5, 2018, entitled "LEARNING COACH FOR MACHINE LEARNING SYSTEM"; and WO/2018/175098 A1, published Sep. 27, 2018, entitled "LEARNING COACH FOR MACHINE LEARNING SYSTEM."

In some embodiments, the set of nodes associated with a module may be changed during the training process. In particular, one or more nodes may be added to or dropped from a module. In some embodiments, the set of modules may be changed during the training process. In particular, a module may be split into a plurality of smaller modules or two or more modules may be combined into a new, larger module. Further, there may be multiple copies of a module trained on different data, with different objectives or with a different context of neighboring modules.

In many classification or regression tasks, the input data may be a vector or matrix of 1, 2, 3 or 4 dimensions with the size in each dimension being a hundred, a thousand or more. A high-resolution image, for example, may have millions of pixels with an input datum having a value for each of three primary colors for each pixel. Typically, in a deep neural network designed to classify such an image, the image will be divided into many small patches with each node in the first hidden layer only connected to pixels in a single small patch. Gradually, higher layers of the network detect features that may span slightly larger portions of the image until eventually the classification depends on the whole image. However, the highest layers learn to detect features or recognize categories wherein each node is active for only a small fraction of the possible feature values or categories. Thus, for any one datum, a large fraction of the network will either be inactive or will be nearly irrelevant to the final output of the network for that datum.

Typically, the training of a large neural network requires many epochs of training in which, for each datum in the training set, a forward computation must be made through all the nodes and connecting arcs in the network and a backward computation must be made to back propagate the estimated values of the partial derivatives of the objective function for the individual datum. The amount of computation is proportional to the size of the network times the number of training data examples times the number of epochs of training. This product is a very large number, so training a very large neural network takes a substantial amount of time even on a computer system with multiple CPUs and GPUs with a total of tens of thousands of processing cores. Most of this computation is wasted in the sense that for each datum in each epoch most of the nodes are irrelevant. However, which nodes are relevant is different for each datum, so without datum-specific information it is difficult to eliminate the excess computation.

In the embodiment of the invention illustrated in FIG. 1, however, computer system 200 keeps a record of the computation for each datum from previous epochs. Therefore, computer system 200 already has some idea for each datum which portions of the network the forward or backward computation is irrelevant and may be skipped. Furthermore, the network is broken into many small modules so that the record-keeping and computation pruning may be done datum-by-datum and module-by-module. This datum-specific, module-specific computation pruning can be highly efficient.

FIG. 1 illustrates a portion of the training process related to one module. In some embodiments, computer system 200 may support parallel processing with multiple computation threads. There may be a plurality of computation threads performing the computations illustrated in FIG. 1 simultaneously for a plurality of modules.

In step 101, computer system 200 determines the context for computations illustrated in FIG. 1 (called the "current context") for one particular module (called the "current module"). The current context comprises various kinds of data in various embodiments. The current context may comprise a description or specification of the current module and of an associated parent network (call the "current parent network"). The current context may comprise one or more links to or identifications of a "neighboring module" for which there are one or more directed arcs connecting a node in the current module to or from a node in the neighboring module.

The current context may comprise a specification of the stream of data currently being used to train the current module (called the "current data stream"). In some embodiments of the invention, the data stream being used to train one module may be different from the data stream being used to train a second module. Two modules may initially be identical except for the difference in the training data streams specified in their respective current contexts.

The current context may also include links or specifications to aid in the storage and retrieval of auxiliary data in steps 103, 107, 109 and 115.

In step 102, computer system 200 obtains a datum from the current data stream. In some embodiments, an aspect of the invention is that a module may have one or more nodes that are each connected by a directed arc to a second node that is in the parent network, but that is not in the module. With respect to a module M, any node in module M that is either an input node of the parent network of module M or that is the destination node of a directed arc whose source node is not in module is called "an input node with respect to the module M." If all the input nodes with respect to the module M are input nodes of the parent network, module M is called a "front-end" module. Any node in module M that is either an output node of the parent network of module M or that is the source node of a directed arc whose destination node is not in the module is called "an output node with respect to the module M."

In the embodiment illustrated in FIG. 1, when processing module M, computer system 200 must obtain an estimate of the activation for any node that is an input node with respect to module M and must obtain an estimate of the partial derivative of an error-loss function for any node that is an output node with respect to module M. If all the output nodes with respect to the module M are output nodes of the parent network, module M is called a back-end module. A module that is both a front-end module and a back-end module is called a "full" module. For example, the parent network is a full module. On the other hand, the set of input nodes of a module may be a proper subset of the input nodes of the parent network and the set of output nodes of a back-end module may be a proper subset of the output nodes of the parent network, so a full module is not necessarily the complete parent network. A parent network may be partitioned into many modules with each module restricted to a subset of the input or a subset of the output. Examples of networks comprising front-end and back-end modules are illustrated in FIGS. 3, 5, 7, 9 and 10.

In step 103, computer system 200 retrieves auxiliary data from a recorded history from previous iterations of training associated with the current datum and/or the current context.

Figure 4:
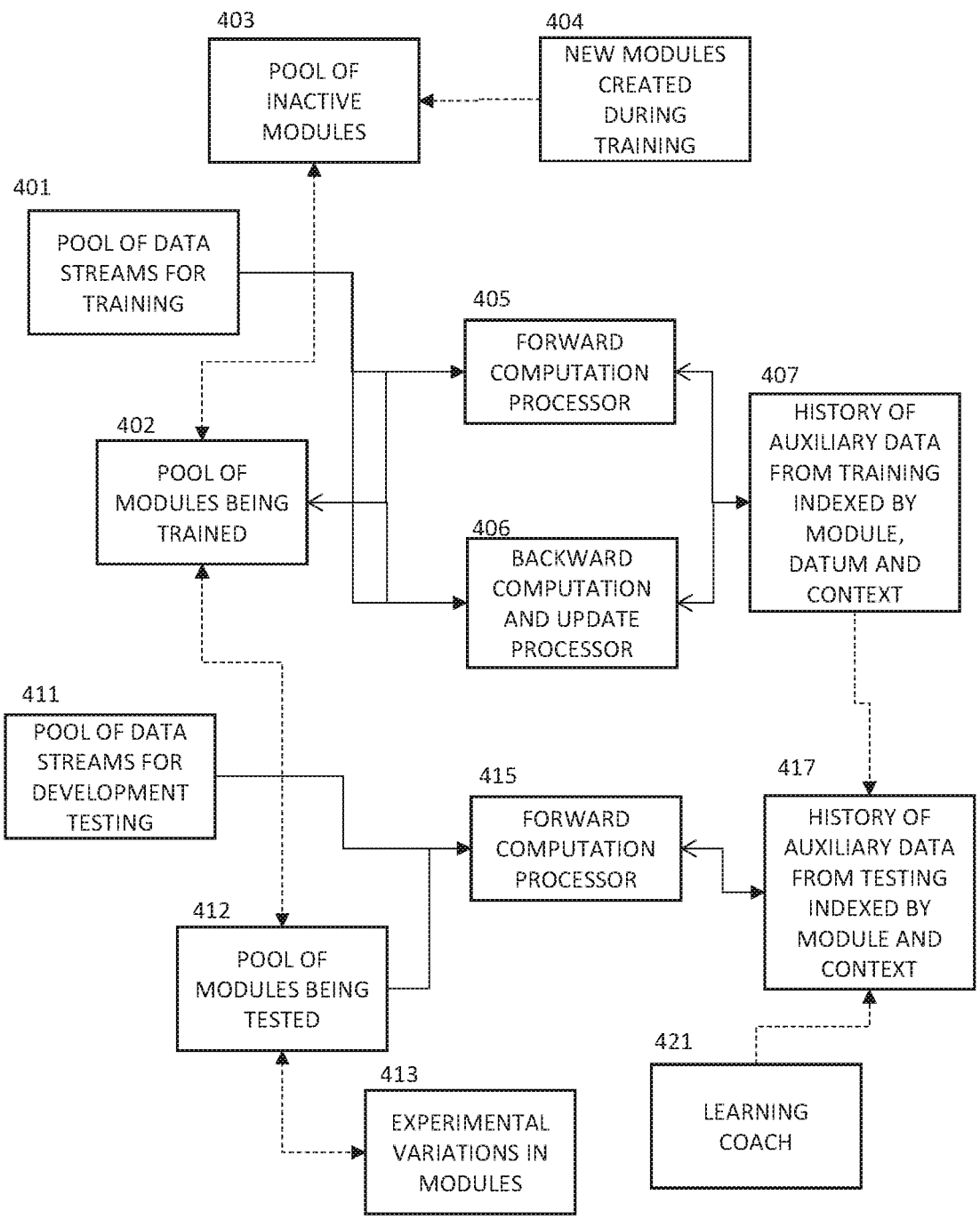
FIG. 4 is a system diagram related to the illustrative embodiment of FIG. 1.

To better understand the relationship of the recorded histories of auxiliary data, consider FIG. 4. FIG. 4 is a schematic system diagram showing the relationships of the pools of data streams, the pools of modules, the processors in computer system 200 performing forward and backward computations on each module, and the recorded histories of auxiliary data that is computed in the course of the forward and backward computations, as well as tests that may be conducted by a learning coach process implemented on computer system 200.

Block 401 is a pool of data streams of training data. In some embodiments, each datum of training data comprises a vector of numerical values representing the values input into the input layer of the parent network. Each datum of training data further comprises some representation of the desired output for the datum, which, in the case of a classification problem, may be a label from a finite set of labels and in the case of a regression problem may be represented by a scalar or vector of numerical values. In either case, the desired output may be represented by an error-loss function by which computer system 200 may compute the cost of the deviation of a particular output from the desired output computed on a given datum in a representation such that computer system 200 can compute the derivative of the error-loss function with respect to each output value.

Block 411 is a pool of data streams of development data. Each module may have a distinct data stream which may comprise a datum that is not necessarily in the data stream of a different module. In some embodiments, there is also no limit to the amount of overlap among the data streams. In some embodiments, no overlap is allowed between the data streams of training data and the data streams of development data.

Block 402 is the pool of modules being trained. The set of modules in block 402 is called a "pool" because computer system 200 may be able to perform parallel processing with a large number of threads so that many modules may be processed at once, but the number of modules may be even larger than the number of threads. A pool of active modules being trained, but not currently being processed by an active thread, may be maintained in block 402 to be available for processing when a processing unit of computer system 200 becomes available.

Block 403 is a pool of inactive modules. Computer system 200 may move a module back and forth between block 402 and block 403 depending on decisions made in the process illustrated in FIG. 1, which are described below. Block 404 comprises a set of modules that have been created during the training process. Computer system 200 may move a module from block 404 to block 403 or block 402 immediately or after some initial processing such as initialization of some of the connection weights in the module.

Block 405 comprises one or more processing units in computer system 200 that are performing a feed forward computation for a module as in step 106 of FIG. 1.

Block 406 comprises one or more processing units in computer system 200 that are performing a back-propagation process for a module as in step 113 of FIG. 1.

Block 407 is a data store that stores a history of auxiliary data for each datum for each round of processing of that datum by block 405 or block 406. The history may comprise data recorded for one or more previous iterations of training and may comprise a history of training on that datum for each of a plurality of modules and for a plurality of contexts in which each module is trained wherein the context may comprise the module being trained as part of a larger network. In some embodiments, the amount of history retained is restricted to limit the total amount of storage required.

Block 411 is a pool of data streams for development testing. In various embodiments, development testing may be used for a variety of purposes, either as specified in the system design or as controlled by a learning coach such as learning coach 421. For example, development testing may be used to make a decision for early stopping in the training of a module. Module-by-module development testing enables computer system 200 to stop training a module that may be overfitting its training data while continuing to train other modules. Under supervision of a learning coach, early stopping may be temporary, allowing training of a module to be reactivated as enabled or required by changes in other modules. Thus, embodiments of the invention may be able to use early stopping much more effectively than previous systems that stopped the training of the whole network early.

Figure 11:
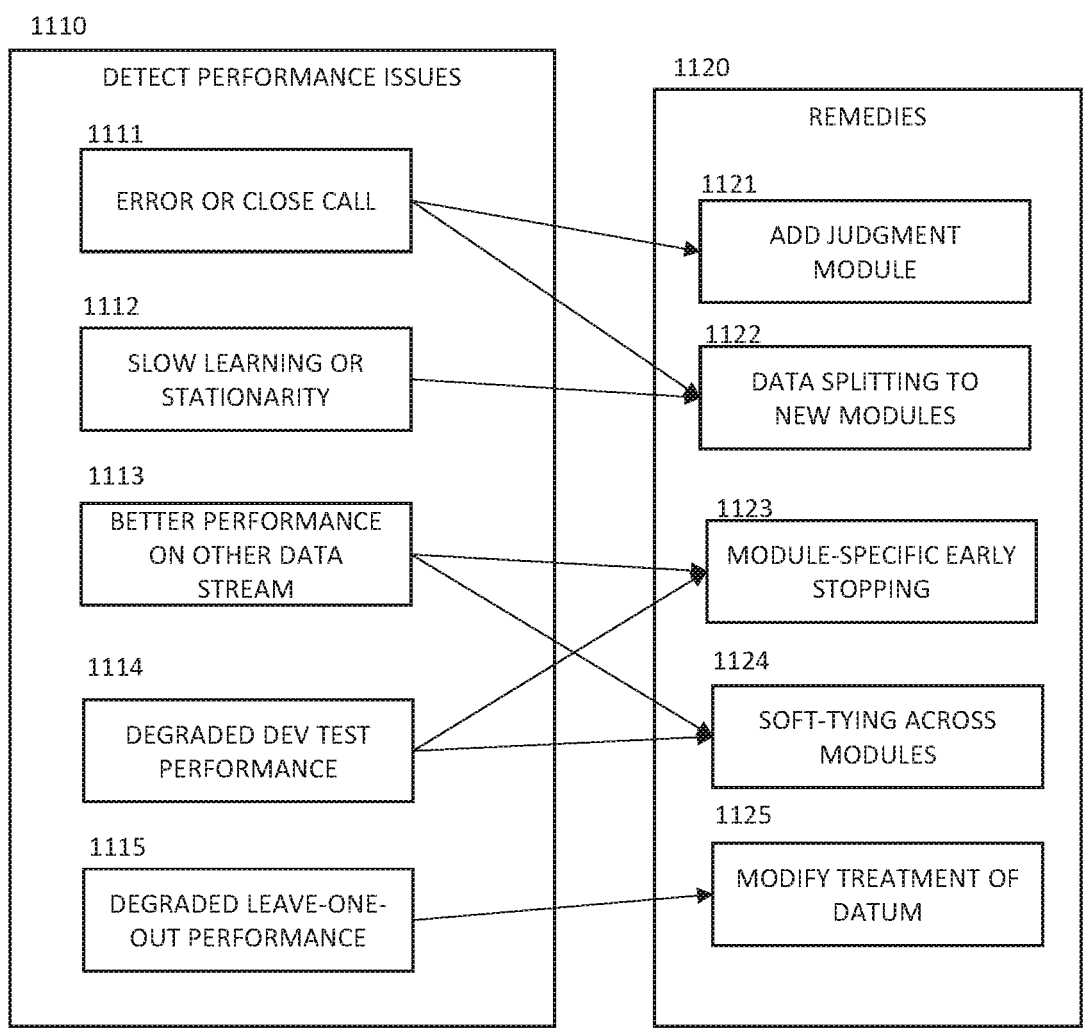
FIG. 11 is a block diagram of an aspect of the invention for detecting and remedying problems in the training process on a module-by-module basis.

Learning coach 421 may also use development testing in other ways as illustrated in FIG. 11.

Block 412 is a pool of modules being tested on development data. Note that, unlike data in a data stream, a module may be in both training pool 402 and testing pool 412 or may move back and forth.

Block 413 comprises one or more modules that have been modified in order to make a comparative performance test. For example, a change in the architecture may be made and tested to see if there is a significant improvement in performance or an improvement in performance/cost. As another example, a datum may be tested by training a module both on a data stream including the datum and on a data stream not including the datum. This comparison testing may be used to diagnose overfitting or even to diagnose a datum that has been mislabeled in the training data.

Block 415 comprises one or more processing units in computer system 200 that are performing a feed forward computation as in step 106 of FIG. 1 on a data stream of development data. The feed forward computation comprises computing the activation of each output node, which, for example, enables computing the error rate and/or the error-loss function averaged over a selection of data.

Block 417 is a data store that stores a history for each module and context of auxiliary data computed in block 415. This historical data may be used by learning coach 421 to help improve the training process. This historical data may also be used by computer system 200 for the decisions made in FIG. 1 for the diagnosis of performance issues and selection of remedies as illustrated in FIG. 11.

Returning to the discussion of FIG. 1, in some embodiments, the auxiliary data retrieved by computer system 200 in block 103 may comprise the activation value of one or more nodes of the current module that may be used for the decision of whether to proceed in step 104. In some embodiments, the auxiliary data retrieved in step 103 may comprise the activation value of one or more nodes that are input nodes with respect to the current module to be used in the feed forward computation in step 106.

In some embodiments, the auxiliary data may further comprise an estimate of the variability of each auxiliary value being stored. In some embodiments, a learning coach may be trained to estimate a probabilistic model for this variability. In some embodiments, the retrieval of an auxiliary datum may comprise a learning coach generating a random example of the auxiliary datum from a probabilistic model. In various embodiments, there may be an indefinite delay between when an auxiliary datum is stored and when it is retrieved. The process of the illustrative embodiment of FIG. 1 is tolerant of this delay. The decisions being made in blocks 104, 108 and 110 are not decisions about the classification of a datum, they are only temporary decisions to skip some of the computation for the current module during the current epoch of training. These decisions can be based on crude estimates of the variables in a decision criterion. An undesirable effect of any such decision may be detected and corrected in a later training epoch. For example, unlike early stopping of the training of the whole network, module-specific early stopping may be temporary.

In step 104, computer system 200 tests whether to proceed with further computation for the current datum in the current context. In some embodiments, for most of the data in the data stream, the computation for the datum will be skipped for most modules. In various embodiments, computer system 200 may decide not to proceed in step 104 for a variety of reasons. In some embodiments, computer system 200, rather than making a deterministic decision of whether to proceed, may instead randomly choose whether to proceed for the current datum for the current module during the current epoch based on probabilities set by computer system 200 based on the system design and the value of hyperparameters with optional control by a learning coach. The probability of proceeding may be set close to or equal to zero or one, so an embodiment that randomly chooses whether to proceed is a generalization of an embodiment that makes a deterministic decision. In some embodiments, some randomness can be utilized as a form of regularization that improves the performance measured on unseen data.

As an illustrative example, computer system 200 may decide in step 104 to skip the remaining computation if computer system 200 estimates that the output will not change much from the recorded history relative to the amount of change in other modules. In some embodiments, computer system 200 may decide not to proceed with the computation because computer system 200 determines that in previous iterations all output nodes of the current module have had stable extreme activation values for the current datum, with the threshold for such a decision based on a criterion determined by the system design and hyperparameters or by a learning coach. "Stable" in this context means low variability (less than a threshold variability) for the activation values for the current datum over a number of epochs. "Extreme" means that the activations are close to (within a threshold value) either the upper or lower boundary value for the range of activation values. The learning coach can set the variability threshold and/or the closeness thresholds. In some embodiments, computer system 200 may decide not to proceed based on the current parent network having had stable output (e.g., variability less than a threshold) for the current datum. In some embodiments, computer system 200 may decide not to proceed based on (i) the magnitude of the partial derivatives of the current parent network error-loss function with respect to the activation of the output nodes of the current module being small (less than a threshold) in magnitude relative to (ii) the magnitude of the partial derivatives of the current parent network error-loss function with respect to the output nodes of other modules.

If the decision by computer system 200 in step 104 is not to proceed, computer system 200 goes to step 105. If the decision is to proceed, computer system 200 goes to step 106.

In step 105, computer 200 determines whether there are further data to be processed in the current context and current data stream. If so, computer system 200 goes back to step 102 to obtain the next datum. If not, computer system 200 goes back to step 101 to obtain a new context, which may be training the current module in a different context or may be training a different module.

In step 106, computer system 200 performs a feed forward computation of the activations of the nodes of the current module. Some modules may have one or more nodes that are each a destination node for one or more directed arcs with a source node in another module. In some embodiments, an estimated activation value is retrieved from the auxiliary data history for the module of the source node. In some embodiments, an estimated activation for the source node may be computed by a learning coach. The estimate by the learning coach may be based in part on data obtained from auxiliary data in the history. In some embodiments, the estimated value computed by the learning coach may be a random variable based in part on a probabilistic model learned by the learning coach. Given the activation values for the input nodes of the module, computer system 200 computes the activation values of the remaining nodes of the module using the well-known feed forward activation computation.

In step 107, computer system 200 records as data in the auxiliary data history store the activation value of one or more nodes of the current module for the current datum.

In step 108, computer system 200 again decides on whether to proceed with further computation. In some embodiments, the decision in step 108 of whether to proceed with further computation for the current datum is similar to the decision made by computer system 200 in step 104, except in step 108 computer system 200 uses the output node activation values computed in step 106 rather than activation values estimated from the history.

In some embodiments, computer system 200 may be much more restrictive in choosing to proceed with the computation in step 108 than in step 104. For example, the current datum may be designated as development data, not to be used in training but for which the feed forward activation values are computed to be used in decisions affecting the training process. As another example, computer system 200 may have determined to apply module-specific early stopping for the current module, so the backward computation is not needed, but computer system 200 may need to compute the feed forward activations in step 106 because the module input values have changed because a neighboring module has not had module-specific early stopping applied. Also, current activations values of the output nodes of the current module may be needed as input by other modules. These example uses for the values computed by the forward computation in block 106 do not require proceeding past block 108.

If computer system 200 decides not to proceed in step 108, computer system 200 returns to step 105 and proceeds as previously described. Otherwise, computer system 200 goes to step 109. In some embodiments, in step 109, computer system 200 retrieves additional auxiliary data from the auxiliary data history. For example, in step 109, the additional auxiliary data may comprise values of partial derivatives of the error-loss function of the current parent network computed during previous iterations with respect to the activations of the output nodes of the current datum in the current context. In some embodiments, the auxiliary data retrieved in step 109 may comprise estimates by a learning coach of the partial derivatives of the error-loss function of the current parent network with respect to the output nodes of the current datum based on computation during previous iterations with the current datum in one or more contexts. In some embodiments, the auxiliary data retrieved in step 109 may comprise partial derivatives of a module-specific error-loss function.

In step 110, computer system 200 again decides whether to proceed with further computation based in part on the additional information retrieved in step 109. If computer system 200 decides not to proceed in step 110, computer system 200 returns to step 105 and proceeds as previously described. Otherwise, computer system 200 goes to step 111.

In step 111, computer system 200 determines whether to estimate a module-specific objective. If the current module has one or more nodes that serve as a source node that is connected via a directed arc to a destination node in a neighboring module, in some embodiments, in step 109, computer system 200 may have retrieved an estimated partial derivative of the error-loss function of the current parent network with respect to the weight of the directed arc from the auxiliary data history.

In step 111, computer system 200 determines, based on a hyperparameter or a decision by a learning coach, whether to supplement or replace this estimated partial derivative of the error-loss function of the current parent network with an estimated partial derivative of a module-specific error-loss function and/or with a node-specific error-loss function for each output node of the current module. To determine such a local error-loss function, computer system 200 goes to step 112, otherwise it goes directly to step 113.

In step 112, computer system 200 determines a module-specific error-loss function and/or a node specific error-loss function for each output node of the current module or directly determines the partial derivatives of such an error-loss function with respect to the output nodes of the module. In some embodiments, computer system 200 retrieves the derivatives the error-loss function from the history of auxiliary data for any module comprising a node which a destination node of a directed whose source node is a node in the current module.

In some embodiments the current module may be derived from a previously trained complete network for which there may be labeled training data. In this case, computer system 200 may derive a module specific error-loss function from the label associated with the output of the module as a stand-alone network if the current datum was a labeled training datum for the current module as a stand-alone network.

Figure 5:
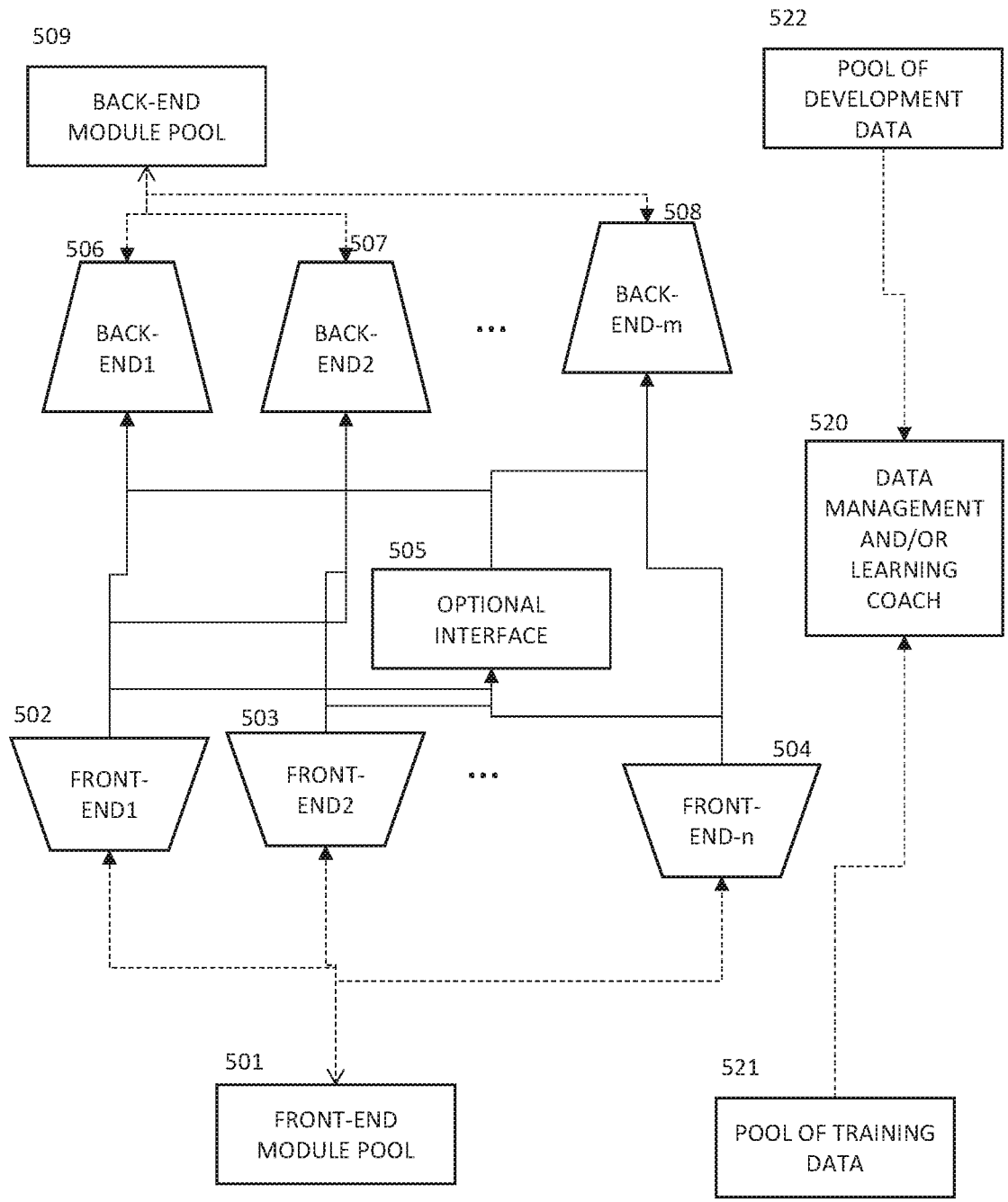
FIG. 5 is a system diagram illustrating the relationship of modules in various embodiments of the invention.

In some embodiments, the parent network of the current module may be a system, such as the system illustrated in FIG. 5, with multiple objectives and with each front-end module optionally connected to a plurality of back-end modules and thereby to multiple objectives. In such embodiments, in step 112, computer system 200 may accumulate, for each output node of the current, the estimated back-propagated derivatives of the error-loss function retrieved from auxiliary history of each of the modules comprising a node that is the destination node of a direct arc whose source node is a node in the current network. In some embodiments, the history of the stand-alone training of a module may be incorporated into a system, such as is illustrated in FIG. 5, with the stand-alone training of a module represented as a front-end module with an empty or pass-through back-end module.

After step 112, or directly from step 111 if step 112 is skipped, computer system 200 goes to step 113. In step 113, computer system 200 performs the well-known back-propagation computation, computing estimates of the partial derivatives of the error-loss function of the current parent module or of the module-specific error-loss function for the current datum and accumulating the estimates of the partial derivatives of the error-loss function until the estimates have been accumulated for all data in a mini batch. When the estimates have been accumulated for a mini batch, computer system 200 updates the learned parameters by incrementing each learned parameter by an amount proportional to the negative of the estimated partial derivative of the error-loss function.

Figure 8:
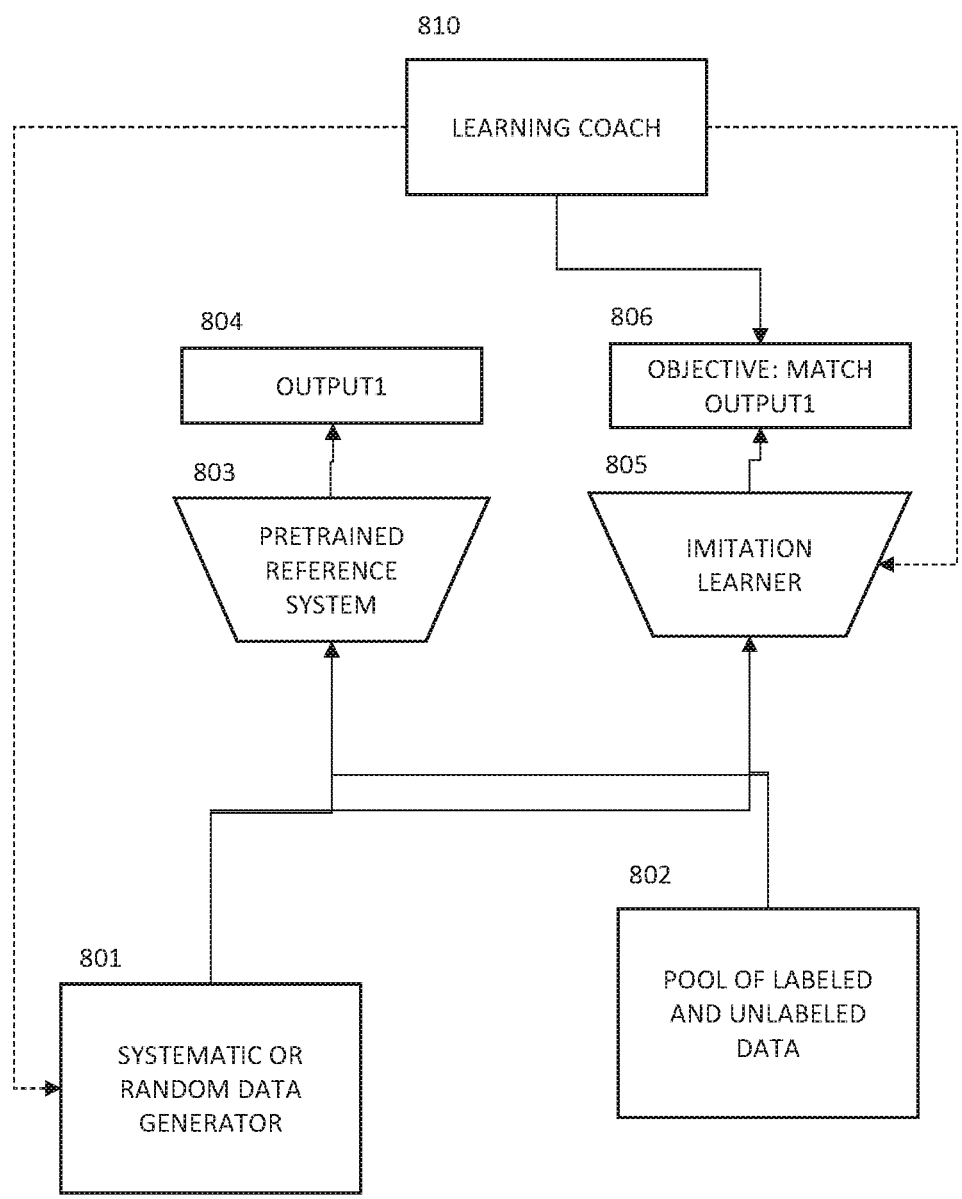
FIG. 8 is a diagram of an illustrative embodiment of an aspect of the invention called imitation learning.

In some embodiments, there may be an alternate embodiment of step 113 for a front-end module. If the current module is a front-end module and if no other module needs to receive back propagated derivatives from the current module, then, in some embodiments, the current module may be a type of machine learning system other than a neural network. It may use a training procedure other than stochastic gradient descent. For example, a front-end module may model a hidden Markov process and may be trained by the well-known Baum-Welch algorithm. Other probability models, for example Gaussian mixture models, may be trained by other algorithms based on the well-known EM algorithm. On the other hand, given a sufficient amount of training data, any front-end based on any other type of machine learning system may be emulated by a neural network in some embodiments. For example, such a neural network may be trained by imitation learning as illustrated in FIG. 8. So, for a front-end module, computer system 200 has flexibility in choosing the type of machine learning system for a front-end module as guided by the system design, hyperparameter controls and/or a learning coach implemented on computer system 200.

In step 114, computer system 200, optionally with assistance from a learning coach, checks the historical performance record for the current module and, in some embodiments conducts performance experiments. In step 115, computer system 200 may optionally take corrective action. Various illustrative techniques that can be utilized by computer system 200 at steps 114 and 115 are shown in FIG. 11.

In step 116, computer system 200 may store auxiliary data computed in steps 113, 114 and 115 in the data history store.

Unless a stopping criterion is met, computer system 200 then returns to step 105 and proceeds as described above.

FIG. 2 is a diagram of a computer system 200 that could be used to implement the embodiments described above and in association with other figures. The illustrated computer system 200 comprises multiple processor units 202A-B that each comprises, in the illustrated embodiment, multiple (N) sets of processor cores 204A-N. Each processor unit 202A-B may comprise on-board memory (ROM or RAM) (not shown) and off-board memory 206A-B. The on-board memory may comprise primary, volatile and/or non-volatile, storage (e.g., storage directly accessible by the processor cores 204A-N). The off-board memory 206A-B may comprise secondary, non-volatile storage (e.g., storage that is not directly accessible by the processor cores 204A-N), such as ROM, HDDs, SSD, flash, etc. The processor cores 204A-N may be CPU cores, GPU cores and/or AI accelerator cores. GPU cores operate in parallel (e.g., a general-purpose GPU (GPGPU) pipeline) and, hence, can typically process data more efficiently that a collection of CPU cores, but all the cores of a GPU execute the same code at one time. AI accelerators are a class of microprocessor designed to accelerate artificial neural networks. They typically are employed as a co-processor in a device with a host CPU 210 as well. An AI accelerator typically has tens of thousands of matrix multiplier units that operate at lower precision than a CPU core, such as 8-bit precision in an AI accelerator versus 64-bit precision in a CPU core.

In various embodiments, the different processor cores 204 may train and/or implement different networks or subnetworks or components. For example, in one embodiment, the cores of the first processor unit 202A may implement the active front end modules 502, 503, . . . , 504 in FIG. 5 and the second processor unit 202B may implement the active back-end modules 506, 507, . . . , 508. As another example, another multiple processor unit (not shown) may implement data management and learning coach 520. Further, different sets of cores in the first and/or second processor units 202A, 202B may be responsible for parallel processing threads for different machine learning modules in the FIG. 5. One or more host processors 210 may coordinate and control the processor units 202A-B.

The processes depicted in FIGS. 1 and 4-12 can be embodied as a set of instructions stored within a memory (e.g., an integral memory of the processing units 202A, 202B or an off board memory 206A couple to the processing units 202A, 202B or other processing units) coupled to one or more processors (e.g., at least one of the sets of processor cores 204A-N of the processing units 202A, 202B or another processor(s) communicatively coupled to the processing units 202A, 202B), such that, when executed by the one or more processors, the instructions cause the processors to perform the aforementioned process by, for example, controlling the machine learning modules 502-508 stored in the processing units 202A, 202B.

In other embodiments, the system 200 could be implemented with one processor unit. In embodiments where there are multiple processor units, the processor units could be co-located or distributed. For example, the processor units may be interconnected by data networks, such as a LAN, WAN, the Internet, etc., using suitable wired and/or wireless data communication links. Data may be shared between the various processing units using suitable data links, such as data buses (preferably high-speed data buses) or network links (e.g., Ethernet).

The software for the various computer systems described herein and other computer functions described herein may be implemented in computer software using any suitable computer programming language such as .NET, C, C++, Python, and using conventional, functional, or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal, Haskell, ML; and examples of scripting languages include Bourne script, JavaScript, Python, Ruby, Lua, PHP, and Perl.

FIG. 3 is an illustrative embodiment of an aspect of the invention in which a neural network is split into a plurality of modules. FIG. 3 also illustrates how a plurality of modules may be combined to form a larger module or, as illustrated, a complete network.

The illustrative neural network shown in FIG. 3 has an input layer 301, five hidden layers 302, and an output layer 303. FIG. 3 illustrates an example where a network has been divided into three modules: a first module 311, a second module 312 and a third module 313. In the embodiment illustrated in FIG. 3, the first module 311 is a front-end module and the third module 313 is a back-end module. The second module 312 is neither a front-end module nor a back-end module. However, the particular number of modules into which the neural network is delineated and the configuration of the modules 311, 312, 313 is provided simply for illustrative purposes. In other implementations, a neural network could be delineated into a different number of modules or different configurations of modules, including modules that encompass partial portions of layers or different numbers of layers than the depicted modules 311, 312, 313, for example.

The illustrated network includes two module separators delineating the various modules 311, 312, 313. In FIG. 3, the first module 311 is separated from the second module 312 by a first separator 321. The second module 312 is separated from the third module 313 by a second separator 322. The updating of the weight of a directed arc for which the source node and destination node are both contained in a single module M, such as arc 331, is performed during step 113 of an instance of the process illustrated in FIG. 1 associated with module M. The updating of the weight of a directed arc with a source node in a first module and with a destination node in a second module may be associated with the updating of either the first module or the second module. In one example embodiment, the updating of the weight of a directed arc is always associated with the updating of the module comprising its destination node.

FIG. 3 also illustrates how modules can be combined to form a large network, which may be a complete network or may be a larger module that is not a complete network.

For example, the first module 311 can be combined with the second module 312 to form a larger front-end module, the second module 312 can be combined with the third module 313 to form a larger back-end module, or all three modules 311, 312, 313 may be combined to form the complete network. In some embodiments, when two or more modules are combined into a larger module, the component modules and the combined module may all be present in the pool of modules to be trained by the process illustrated in FIG. 1.

In various embodiments of the invention there are several methods by which computer system 200 may specify, for a node that is an output node relative to a module, an error-loss function or may directly obtain an estimate of the partial derivative of an error-loss function. For example, if the node is also an output node of the parent network of the current module, a training data label and/or an error-loss function is directly available during training. If the current module is a back-end module for some trained complete network that has been trained on the current datum, then an error-loss function may be obtained from the training of the network of which the current module is a back-end module.

FIG. 5 is a schematic block diagram of an illustrative aspect of the invention in which the system comprises a plurality of front-end modules and a plurality of back-end modules. The system illustrated in FIG. 5 may be configured to represent exponentially many parent neural networks by various combinations of front-end modules and back-end modules. By way of illustration, FIG. 5 has n>1 front-end modules, illustrated by front-end modules 502, 503 and 504, and m>1 back-end modules, illustrated by back-end modules 506, 507 and 508. Further, although not depicted in FIG. 5, the system can further include one or more hidden modules.

The system illustrated in FIG. 5 may further comprise a learning coach and/or data management system 520 implemented on computer system 200. In various embodiments, learning coach 520 may manage the selection of active modules from the front-end module pool 501 and/or back-end modules pool 509, the connections among the modules, and the selection of data streams from the pool of training data 521 and the pool of development data 522.

Each of the front-end modules may be connected directly to any subset of the back-end modules, as specified by the system design or as managed by learning coach 520. Each front-end module may also be connected to optional interface 505 and thereby be indirectly connected to any specified subset of the back-end modules.

In addition, the system may comprise an additional pool of front-end modules 501 from which new front-end modules may be added to the active system. Conversely, any of the n active front-end modules may also be temporarily made inactive and moved to the front-end pool 501. Similarly, there may be a pool of back-end modules 509 from which new back-end modules can be drawn and/or to which active modules can be moved.

Learning coach 520 may also create new front-end or back-end modules. For example, learning coach may create new modules to remedy problems during training, as illustrated in embodiments of blocks 1121 and 1122 of FIG. 11 and other corrective actions which may be performed by computer system 200 in block 115 of FIG. 1.

In various embodiments, learning coach 520 may conduct various kinds of tests or experiments. For example, learning coach 520 may compare the performance of a selected system configuration on a selected set of development test data while learning coach 520 varies the selection of training data. Learning coach 520 may also compare the performance of a trained model when learning coach 520 varies the development test set. From this information, learning coach 520 may estimate the bias and variance of the models and diagnose problems of underfitting and overfitting and try various remedies as illustrated in FIG. 11 or various existing remedies for overfitting or underfitting that are well-known to those skilled in the art of machine learning and neural network training.

In some embodiments, learning coach 520 may detect and diagnose problems with the training data. For example, learning coach may 520 compare the performance of one or more selected system configurations when trained on two training data sets that differ by including or excluding a training datum. If performance is worse when the datum is included, the datum may be mislabeled in the training data or may be an outlier for the category that it represents. When such a condition is detected, learning coach 520 may take a variety of corrective actions in various embodiments of the invention. For example, learning coach 520 may simply drop the datum from the pool of training data.

In some embodiments, learning coach 520 may conduct comparative experiments measuring the performance on development data of a plurality of system configurations and training conditions. Learning coach 520 may then select a preferred configuration based on specified criteria for cost and performance.

In some embodiments, learning coach 520 may also measure performance and detect and diagnose problems for an individual front-end module. In some embodiments, a front-end module may represent a machine learning system with labeled training data such that the front-end module may be trained as a stand-alone system. Examples of such front-end modules are illustrated by FIGS. 6, 7, 9 and 10. In such embodiments, learning coach 520 may conduct experiments on the front-end module and optimize its performance, including, if necessary, module-specific early stopping.

Figure 6:
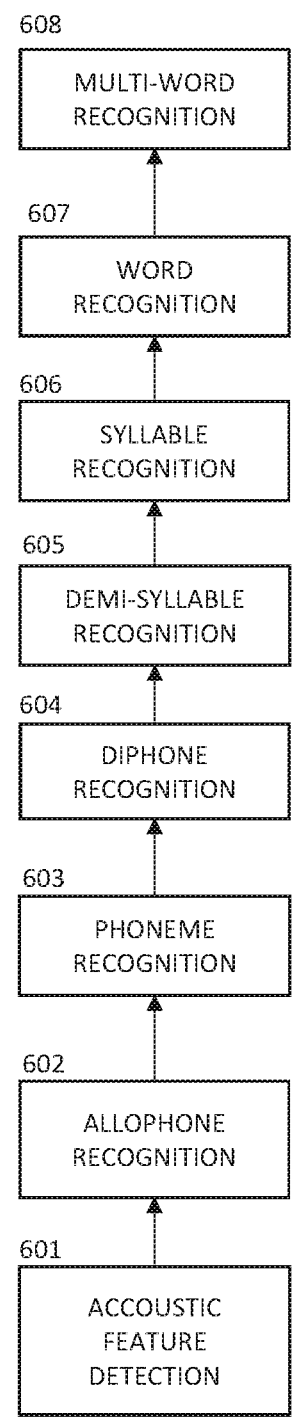
FIG. 6 is a diagram of the relationship of front-end modules is an illustrative embodiment of a portion of a modular speech recognition system.

FIG. 6 shows multiple illustrative examples of aspects of the invention in which front-end modules for speech recognition may be trained as stand-alone systems. In FIG. 6, each block in the diagram and each subsequence of blocks in the diagram may be trained as a stand-alone system with labeled input and output. In the illustrative example, each block represents a whole collection of modules with a separate module for each category in the set of output categories for the block. Thus, there might be, say, 12 acoustic feature modules, 150 allophone modules, 50 phoneme modules, 1000 diphone modules, 2500 demi-syllable modules, 10,000 syllable modules, 300,000 word modules and millions of multi-word modules. Multi-word recognition module 608 does not refer to a statistical model for word n-gram frequencies. Rather it refers to an acoustic model for two or more words spoken together.

Neither an end-to-end neural network nor an integrated hidden Markov process model requires segmentation of the audio recording into sounds and words or a precomputation of the alignment to the script. However, the embodiment illustrated in FIG. 6 does use such a segmentation and alignment to facilitate coordination of the outputs and inputs of successive module layers. This segmentation and alignment process is only needed during the training process. It only needs to be computed once. It is not used by the recognition system once it has been trained. Such a segmentation and alignment to a known script can easily be computed for a hidden Markov process model using the well-known Baum-Welch algorithm for model training and best-path alignment.

For example, from a speech audio recording with a known transcript, a hidden Markov process model may be trained using the well-known Baum-Welch algorithm to compute the probability distribution for the beginning and ending time in the audio recording of each word (block 607) in the transcript. A multi-word alignment (block 608) may easily be determined from the word alignment.

Given the probabilistic word alignment and a pronunciation dictionary, a hidden Markov process model may be trained to compute the beginning and ending time of each phoneme (block 603) and thereby each diphone (block 604), demi-syllable (block 605) and syllable (block 606). Allophone models (block 602) may be trained as components of a Gaussian mixture model for each phoneme. Aligned phoneme and allophone transcription may be used to train acoustic feature models (block 601). With hidden Markov process alignment, the alignment may be probabilistic, allowing overlap in the segmentation. On the other hand, in some embodiments, a best path alignment may be computed with a definite best-estimate beginning and ending time for each segment.

In some embodiments of a system such as the system illustrated in FIG. 5, the aligned labels at the output of each of the blocks 601-608 may be used as training data to train a front-end neural network module representing any subsequence of the blocks 601-608. Although a hidden Markov process model may be used to obtain data for stand-alone module training, the finished recognition system, such as illustrated in FIG. 5, may be purely a neural network, not a hybrid system combining Markov process models and neural networks. On the other hand, step 113 of FIG. 1 does allow a hidden Markov process model or another type of machine learning system to be used as a front-end module even though the other modules are neural networks, so some embodiments may use a hybrid system even though that is not required by the use of a hidden Markov process model in computing the alignments for the modules illustrated in FIG. 6.

In some embodiments, the hierarchical stack of front-end modules illustrated in FIG. 6 provides repeated opportunity for computer system 200 to save computation during training by choosing not to proceed with further computation in block 104, 108 or 110 of FIG. 1. Recall that in FIG. 1, in step 104, computer system 200 may decide not to proceed with further computation on the current datum if, for any of several reasons, computer system 200 does not expect the output of the current module on the current datum to differ significantly from an output value that can be retrieved from the recorded history of auxiliary data.

In a detector or classifier, the computation may be skipped if the output value is sufficiently extreme in either direction, that is, if the module is sure of its decision of detection or non-detection (e.g., has a confidence value greater than a threshold that an object was detected or have a confidence value greater than a threshold that the object was not detected). Whether the decision is right or wrong, further computation will be unlikely to change the decision. In some embodiments, if the decision is in error, computer system 200 will attempt to correct it by methods, such as those illustrated in FIG. 11, without doing many iterations of fruitless incremental training based on stochastic gradient descent.

In the case of a speech recognition front-end, the computation may be skipped if the current datum matches the model of the current module very poorly or very well. In speech recognition there are only about 50 phonemes in a typical language. When matching a given sound segment, only a small fraction of the phoneme models will match well enough to merit recomputing the match rather than using the match score from the recorded history of earlier training passes. After a moderate amount of training, the phoneme models may have stabilized so that even the forward activation for the correct answer usually will not need to be recomputed except in special cases such as an unusual pronunciation.

Proceeding up the hierarchy of front-end modules, computer system 200 may be more and more selective in proceeding with the computation for a given datum for a given module. With a 300,000-word vocabulary in block 607, the vast majority of the words will be long polysyllabic words. To estimate how selective computer system 200 may be in blocks 104, 108 and 110 in FIG. 1, consider a word-spotting task. In a word-spotting task, performance is often measured by counting the number of false alarms per hour. A typical target for a good word-spotting system is to make less than one false alarm per hour for a polysyllabic word. Furthermore, the vast majority of the actual instances of a long polysyllabic word will be reliably detected. In terms of step 104 of FIG. 1, these word-spotting performance figures mean that computer system 200 only needs to proceed with the forward computation for about one datum out of about 6,000 for a hundred-word-per-minute speaker. False detection or false rejection will be even rarer for multi-word phrases in block 608. Thus, for a speech recognition system with modules such as those illustrated in FIG. 6, the embodiment illustrated in FIG. 1 may be able to reduce the amount of computation for training by orders of magnitude.

Figure 7:
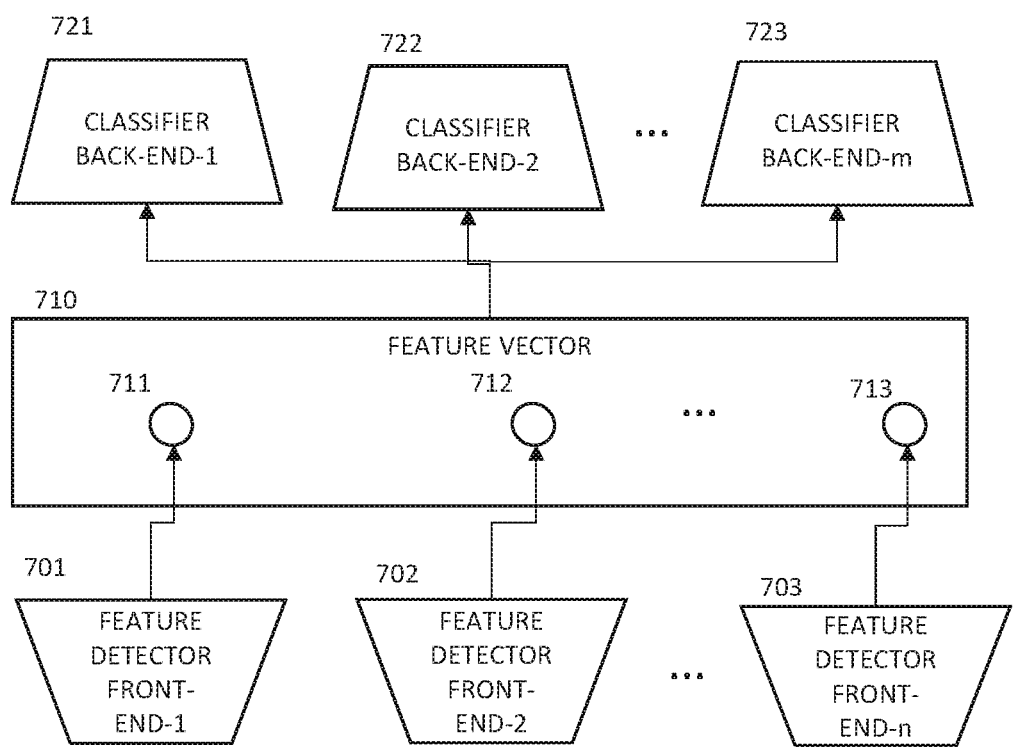
FIG. 7 is a diagram of an illustrative embodiment of an aspect of the invention comprising feature detector front-end modules.

FIG. 7 is an illustrative embodiment of the invention that enables improved interpretability, greater robustness, improved efficiency with reduced computation both during training and during operational use.

The illustrative embodiment comprises n≥1 feature detector front-end modules represented, in this example, by feature detector front-end modules 701, 702 and 703. It further comprises feature vector hidden layer 710, comprising n feature nodes represented, in this example, by feature nodes 711, 712 and 713 corresponding to feature detector front-end modules 701, 702 and 703. The illustrative embodiment further comprises m≥1 classifier back-end modules represented, in this example, by classifier back-end modules 721, 722 and 723. The number m of back-end modules is independent of the number n of front-end modules.

A feature detector is a machine learning system that is trained to discriminate the presence or absence of a binary-valued feature in an input datum. In some embodiments, each feature detector module may share the same vector of input values for each datum. In some embodiments, the input vectors of the feature detector modules may be disjoint. In some embodiments, the input vectors may overlap but be distinct.

In the illustrative embodiment of FIG. 7, the feature detector front-end modules may be designed to be easy to interpret. In addition, the design and architecture of the parent network may be modified to enhance the interpretability of the feature detector front-end modules.

In an example embodiment, a front-end detector module may first be trained as a complete stand-alone network. In some embodiments, there may be labeled training data for the feature and the feature detector module is initially trained on this labeled data, so the output of the feature detector is easily interpretable.

In some embodiments, a first front-end feature detector module may be trained in the context of a parent network, such as illustrated in FIG. 7, with one or more classifier back-end modules. Then a stand-alone second feature detector module for the same feature may be designed with a simpler architecture or other design features to optimize its interpretability. The second feature detector module may then be trained by imitation learning as illustrated in FIG. 8. Finally, the second, more easily interpreted, feature detector may be substituted into the parent network in place of the first front-end feature detector module. Further training may then be performed on the complete parent network with the new feature detector.

In some embodiments, the parent network illustrated in FIG. 7 and all the modules may be trained by the process illustrated in FIG. 1. In some embodiments, a first classifier back-end module may be trained in the context of a parent network such as illustrated in FIG. 7. Then a stand-alone second classifier back-end module may be designed to optimize its interpretability. The second, more interpretable, classifier back-end module may then be trained by imitation learning as illustrated in FIG. 8. Finally, the second classifier back-end module may be substituted into the parent network in place of the first classifier back-end module for further training.

Another aspect of the illustrative embodiment shown in FIG. 7 is that the objective of each classifier back-end module may be specified independently of any of the others. That is, some of the back-end classifier modules may be training on a completely different classification problem than others. Having each front-end module participate in multiple classification problems with different objectives helps make each front-end module more multi-purpose and more robust.

Connecting n front-end modules with m back-end modules by way of feature vector 710 reduces the amount of computation compared to an n by m cross-point connection. It also reduces the number of learned parameters, which reduces the risk of over fitting and aids generalization.

FIG. 8 is an illustrative embodiment of an aspect of the invention, imitation learning, which has been mentioned in association with the discussion of FIG. 7. The embodiment illustrated in FIG. 8 comprises a first machine learning system 803 that has already been trained and that is to be used as a reference system for imitation learning. The embodiment further comprises a second machine learning system 805 that is to be trained with the objective 806 to have its output match the output 804 of the first machine learning system 803 on the same input datum. In some embodiments, learning coach 810 may add regularization or otherwise modify the objective 806. The embodiment may further comprise a pool of labeled and unlabeled data 802 and a generator 801 that may generate example data either using a systematic procedure or that may generate random data. Learning coach 810 may also control the generator 801 and may modify the architecture of imitation system 805.

The embodiment of imitation learning illustrated in FIG. 8 has several important aspects. First, there need not be any labeled data. Even if there is labeled training data, the training of imitation system 805 does not depend on those labels. Second, data generator 801 may generate an unlimited amount of data. Finally, the process of training the imitation system 805 may be supervised by learning coach 810, which may be implemented on computer system 200. Learning coach 810 may monitor the training process and may make changes to the architecture of imitation system 805 to enhance its capability to imitate and/or to make imitation system 805 easier to interpret. For example, learning coach 810 may monitor the performance of imitation system 805 on development data that has been set aside and is disjoint from the training data.

For example, if learning coach 810 detects overfitting by imitation system 805 on a given set of training data, learning coach 810 may increase the amount of training data or may modify imitation system 805 to decrease the number of degrees of freedom of its learned parameters. As another example, learning coach may comprise criteria that reflect the relative ease of interpreting alternative architectures for imitation system 805 and/or may have been trained to estimate the interpretability as a function of architectural features such as the number of layers in a neural network, the total number of nodes and the total number of connecting arcs. Learning coach 810 may then experimentally explore changes in the architecture of imitation system 805 in order to optimize a combined measure of its imitation accuracy and its interpretability. In some embodiments, learning coach 810 may measure the accuracy of imitation system 805 on data that has not been used in training 805 so that the measure of accuracy will comprise measuring the ability of imitation system 805 to generalize to new data.

Figure 9:
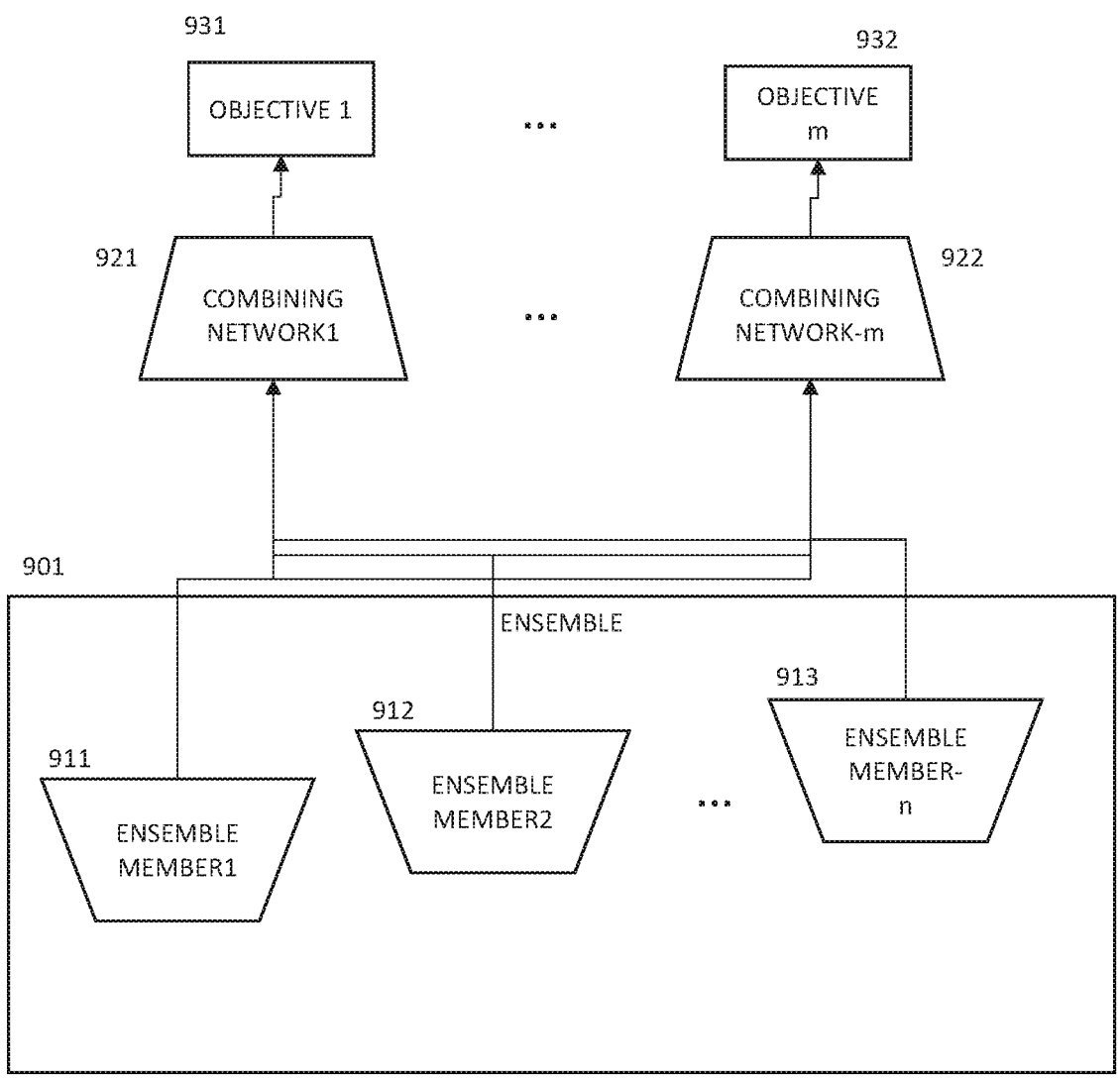
FIG. 9 is a diagram of an illustrative embodiment of an aspect of the invention comprising a multi-objective modular deep learning network built from an ensemble.

FIG. 9 is system diagram of another example embodiment of the invention. The embodiment illustrated in FIG. 9 comprises an ensemble 901 of n≥1 ensemble members represented, in this example, by ensemble members 911, 912 and 913. The embodiment further comprises m≥1 combining networks represented, in this example, by combining networks 921 and 922. Each combining network is associated with a separate objective represented, in this example, by objectives 931 and 932 corresponding to combining networks 921 and 922. The system illustrated in FIG. 9 may be trained by the process illustrated in FIG. 1, with each ensemble member and each combining network as a separate module.

Ensembles of multiple machine learning systems are well known to those skilled in the art of machine learning. Typically, the output of an ensemble is computed by combining the outputs of the ensemble members using a fixed rule, such as a voting scheme (the category with the most votes being chosen) or a composite score computed by arithmetic or geometric averaging. With such methods each ensemble member must be trained with the same single objective. In the embodiment illustrated in FIG. 9, however, the output for each objective is computed by computer system 200 using a neural network, i.e., the combining network. In embodiments in which m>1, each combining network combines the outputs of the n ensemble members to meet the combining network's specific objective.

Each combining network may be taught by computer system 200 to learn an arbitrarily complex combing computation, customizing it to objective. In addition, in some embodiments, computer system 200 back propagates to each ensemble member the partial derivatives of the error-loss function of each of the objectives. This back-propagation process, which is called "joint optimization," trains each of the ensemble members to meet multiple objectives. More details about joint optimization networks can be found in PCT Application No. PCT/US2018/052857, published as WO2019/067542, filed Sep. 26, 2018, entitled JOINT OPTIMIZATION OF ENSEMBLES IN DEEP LEARNING, which is incorporated herein by reference in its entirety.

In these embodiments, the system illustrated in FIG. 9 not only combines the results of the ensemble members, it optimizes each ensemble member to achieve the best combined result on the combined set of objectives. Having multiple objectives makes the training of the ensemble more robust. With back propagation into the individual ensemble members, each ensemble member is also made more robust. With a conventional fixed formula combining rule, training an ensemble to meet multiple objectives would be much more constrained and there would be no joint optimization back propagation into the individual ensemble members.

The system illustrated by FIG. 9 may be implemented as a single large neural network. This neural network may be trained as a single network using stochastic gradient descent or the system may be represented as a network of modules with each ensemble member and each combining network as a separate module. Then the system may be trained by the process illustrated in FIG. 1.

Figure 10:
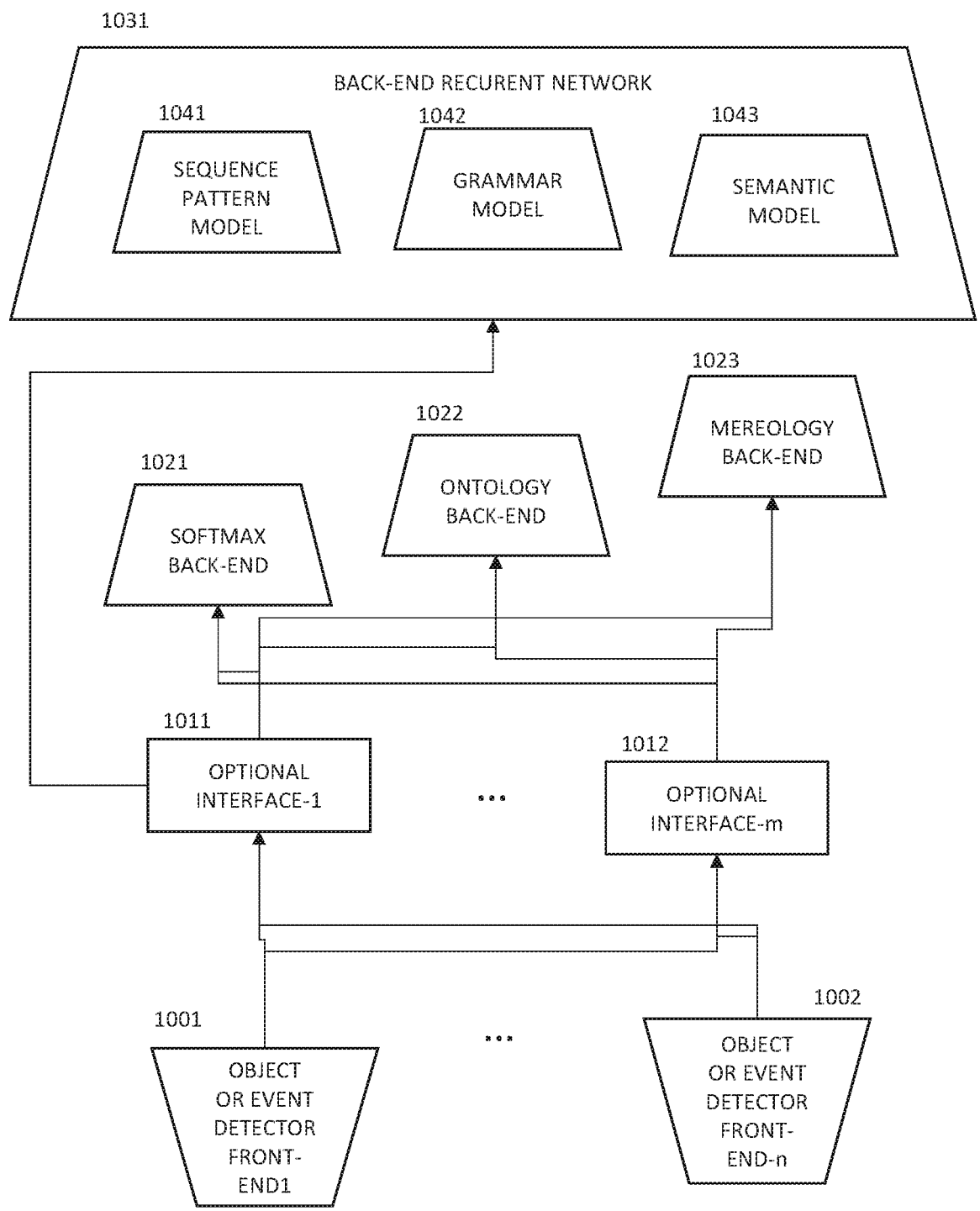
FIG. 10 is a diagram of an illustrative embodiment of the invention with explicit representation of higher-level knowledge structures and logical relationships.

FIG. 10 is a block diagram of an illustrative embodiment of another aspect of the invention. The system illustrated in FIG. 10 comprises one or more modules with explicit representations of interpretable knowledge. Blocks 1021, 1022, 1023, 1041, 1042 and 1043 are examples of such explicit knowledge representation modules.

In some embodiments, a neural network may comprise some or all of the types of modules represented in FIG. 10 and/or other structured representations of knowledge. Such a network may be trained as a single network using stochastic gradient descent or may be trained as a network of modules by a procedure such as illustrated in FIG. 1.

The example system illustrated in FIG. 10 comprises n≥1 front-end modules, represented, in this example, by front-end modules 1001 and 1002. It may further comprise m≥1 optional interface modules represented, in this example, by optional interface modules 1011 and 1012. It further comprises back-end modules of one or more types that use various forms of explicit knowledge representation, as illustrated by way of example by various types of back-end modules 1021, 1022, 1023, 1041, 1042 and 1043.

In the example embodiment illustrated in FIG. 10, the front-end modules can include object or event detectors, as represented by object or event detector front-end modules 1001 and 1002. The words "object" and "event" are to be interpreted broadly as anything that a front-end module in a neural network might be able to detect. By way of example, an "object" might be a small section of an edge in an image or might be a larger more complex object such as an eye that is part of an even larger object such as a face. An event might be a sound in an audio recording or an anomaly or a regular pattern that intermittently occurs in any form of data. In some embodiments of the system illustrated in FIG. 10, the detection of a feature in the sense of the feature detector front-end modules of FIG. 7 might be considered an event detection. The distinguishing characteristics of a system such as illustrated in FIG. 10 are in the knowledge representation back-ends, not in the particular types of front-end modules.

By way of illustration, a back-end module may represent a mereology 1023. A mereology is a logical relationship such as characterized by the phrase "is a part of." Thus, a finger "is part of a hand," a hand "is part of an arm," and an arm is "part of a body." As another example, an ontology 1022 is a logical relationship characterized by the phrase "is a kind of" or just "is a" for short. Thus, a horse "is a (kind of)" mammal, and a mammal "is an" animal, and an animal "is a" mobile living thing, and mobile living thing "is a" living thing (which includes plants)," and finally a living thing "is a kind of" object. Both mereologies and ontologies have applications, for example, to computer vision in which an object that occupies a small part of an image may be part of a larger object and/or the category of the object may be a subset or a superset of some other category.

As a more abstract example, a softmax back-end module 1021 is a neural network structure with a set of nodes representing categories where the softmax represents the relationship that the categories are mutually exclusive. That is, a given datum represents one and only one of the categories.

In general, most small portions of an image will not be part of the object being detected and in early passes of the training process these portions of the image may be determined as not needing further processing during later passes in the training process. Portions of the image may be identified as potentially being parts of a larger object for which further processing is warranted, but the additional processing may be limited by the back propagation from one of the back-end modules with explicit knowledge because the lower level detection is inconsistent with the plausible higher-level features and categories. In the supervised training process illustrated in FIG. 1, the image of a given datum of training data has a label identifying the target object, so the back-propagation computation may greatly restrict the possible interpretation of the front-end object and limit the useful event detections for any one datum. Repeated computation of a lower-layer detection of an object that is not useful to higher layers for a particular datum is not needed once the higher layers of the network have learned to ignore it in the example of this datum. Computation of such a detection may then be skipped for this datum in block 104 of FIG. 1.

Back-end module 1031 represents a recurrent neural network, which may be represented by computer system 200 as a feed forward network comprising multiple modified copies of the recurrent network with each recurrent connection replaced by a connection that goes to the next copy of the recurrent network. Such unfolding of a recurrent neural network is well known to those skilled in the art of training recurrent neural networks. Such an unfolded recurrent network may be used to model a sequence of data such as a time series of measurements, a text document, an audio recording or a video. In the embodiment illustrated in FIG. 10, the entire time series or sequence may be considered a single datum or there may be detection targets that occur at a single point in time or over a limited interval of time.

Back-end module 1031 may comprise one or more modules that represent specific types of specialized knowledge. By way of example, the back-end modules with explicit knowledge structures, e.g., back-end modules 1021, 1022 and 1023, also apply to sequence or time series data. In addition, the back-end recurrent neural network 1031 may comprise one or more modules with other specialized forms of explicit knowledge representation. For example, in an economic time series certain patterns may help predict future events in the time series and thus be valuable to detect. As another example, in speech recognition, optical character recognition or handwriting recognition, certain word n-grams may have a much higher probability of occurrence than other n-grams. The knowledge in these examples may be represented by a back-end module such as the sequence pattern model back-end module 1041.

In these recognition tasks and other natural language processing tasks, such as machine translation and text generation, syntactic knowledge represented by a grammar model (e.g., the grammar model back-end module 1042) may be valuable and may contribute knowledge distinct from the knowledge represented in the n-gram statistical models in the sequence pattern model back-end module 1041. As another example, for an artificial intelligence system designed to carry on a conversation or to generate meaningful text, semantic knowledge such as can be represented by a semantic model back-end module 1043 may be needed.

In general, each of the specialized back-end modules exemplified by the illustrated back-end modules 1021, 1022, 1023, 1041, 1042 and 1043 contribute to the task of the parent neural network, not only making it more likely for computer system 200 to compute the desired answer, but also tending to restrict the output to answers that are more meaningful. They also make the output and the operation of the parent network easier to interpret.

In addition to the benefits listed above, these knowledge-based back-end modules help reduce the amount of computation in the embodiment illustrated by FIG. 1.

In developing a neural network for a given task, the current methods for detecting problems during the training process tend to measure the performance of the network as whole and the remedies tend to affect the whole network. For example, if during training the performance on training data continues to improve with each epoch of training, but the performance on independent development test data begins to degrade, a recommended "best practice" is to stop the training, a practice known as "early stopping." Such early stopping may be better than not stopping at all, but calling it the "best practice" is an example of a logical fallacy that philosophers call the "fallacy of the excluded middle." Logically, stopping the process of iterative gradient descent training updates does not have to be an all-or-none decision applied to the whole network. However, the recommended "best practice" of "early stopping" stops all training for the entire network.

In the embodiment illustrated by FIG. 1, on the other hand, the tests performed by computer system 200 in block 114 of FIG. 1 are specific to a single module and, furthermore, some of the tests are specific to a single datum. This module-specific, datum-specific problem detection allows for current techniques to continue to be used, but also enables more specific diagnoses and more targeted corrective actions to be executed, e.g., in block 115 of FIG. 1.

FIG. 11 is a block diagram illustrating some targeted techniques for detecting problems or performance issues with the network and/or the modules thereof and corresponding corrective actions to address any detected performance issues, in accordance with various aspects of the present disclosure. The arrows in FIG. 11 indicate the relationship between some of the techniques for detecting performance issues and some of the techniques that can potentially be utilized to remedy any corresponding performance issues; however, these example relationship are simply for illustrative purposes and the computer system 200 is not limited to implementing any particular combination of performance detection and performance correction techniques.

Block 1110 includes a collection of illustrative examples of techniques for computer system 200 to detect performance problems. In one aspect, any one or combination of the techniques set forth in block 1110 can be executed by the computer system 200 at block 114 of FIG. 1 during training of a module of a neural network, for example. As discussed above, the problem detections illustrated in block 1110 may be done for a specific module and, in some cases, for a specific datum. The techniques for detecting performance problems illustrated in block 1120 are merely examples and the computer system 200 could additionally execute other performance detection techniques known in the field.

Block 1120 is a collection of illustrative examples of techniques that may be used by computer system 200 as corrective actions. In one aspect, any one or combination of the techniques set forth in block 1120 can be executed by the computer system 200 at block 115 of FIG. 1, for example. The corrective techniques illustrated in block 1120 are merely examples and the computer system 200 could additionally execute other corrective techniques known in the field.

One example approach to detecting performance issues with the parent network and/or modules thereof that can be utilized by computer system 200 is to determine whether the output of an output node of the module is incorrect or can be considered to be a close call, as set forth in block 1111. In one embodiment, computer system 200 can execute block 1111 in block 114 of the process illustrated in FIG. 1. Block 1111 can include a variety of different techniques for detecting an error or close call in an output node of a module, even in the case in which the node is in an inner or hidden layer of the parent network. In one aspect, if the output of the module is also an output node of the parent network, an error or close call may be detected directly by the difference in score for the correct answer and the score of the best scoring incorrect answer. An error can be detected if the best scoring incorrect answer has a better score than the correct answer. A close call can be detected if the difference in score between the correct answer and the best scoring incorrect answer is than a specified threshold. In another aspect, if the output node of the module is not an output node of the parent network, then the detection of an error or close call by the module must be determined indirectly. An error or a close call by the parent network is neither a necessary nor a sufficient condition for determining that an error or close call has been made by an individual module.

In one illustrative embodiment of a technique of a technique for detecting an error or close call, computer system 200 can obtain, in block 114 of FIG. 1, a value estimated for the partial derivative of the error-loss function of the parent network with respect to the output node of the module. The value estimated for the partial derivative of the error-loss function of the parent network may be obtained either by a current back-propagation computation in block 113 of FIG. 1 or by retrieval of auxiliary data from a previous pass of training in block 109. In addition, in the illustrative embodiment, computer system 200 obtains an estimated or computed value for the activation of the output node of the module for the current datum, either from a computation in block 106 or from a retrieval in block 103.

Computer system 200 then determines a condition of an error or close call by comparing the sign of the difference of the value of the activation of the output node and a specified threshold value to the sign of the estimated value of the derivative of the error-loss function of the parent network. If the sign of the derivative is such that an update in the direction of the estimated negative gradient of the error-loss function would increase the magnitude of difference between the current activation and the specified threshold, then the back-propagation computation is indicating that the output node's current activation is reinforcing the desired output for the parent network. In the illustrative embodiment, in this situation, computer system 200 designates that the current module is not making an error on the current datum. However, if the difference in magnitude of the activation value of the output node of the module is less than a specified threshold, this activation is designated by computer system 200 as a close call although not an error. Alternatively, if the sign of the partial derivative is such that an update in the direction of the estimated negative gradient of the error-loss function of the parent network would decrease the magnitude of the difference between the current activation value of the output node of the module and the specified threshold, then the back-propagation computation is indicating that the output node should be updated in the direction of the estimated negative gradient of the error-loss function, which would eventually change the sign of the difference between its activation value and the specified threshold. That is, the current activation of the output node is reinforcing an incorrect answer by the parent network. This condition is designated by computer system 200 as an error by the output node of the module.

If an error or a close call is detected for the current datum, it is not necessarily a problem if the activation value of the node has been changing in the desired direction by a non-negligible amount from epoch to epoch in the recent history of the training. In such a case, continued training is likely to fix the error or increase the margin on the close call. However, if an error or close call is detected and the activation value is changing in the wrong direction or is changing by a negligible amount, then a decision to take a corrective action may be applied by computer system 200, depending on criteria represented by hyperparameters or by a learning coach implemented by computer system 200. Examples of corrective actions that might be taken in this case are represented by blocks 1121 and 1122.

One example corrective action that can be utilized by computer system 200 when an output node of a module is outputting an error or a close call is to add a judgment module to the network, as set forth in block 1121. In one embodiment, computer system 200 can execute block 1121 in block 115 of the process illustrated in FIG. 1. In block 1121, computer system 200 takes corrective action by adding a judgment module to the network, as will be explained further in association with FIG. 12. Adding a judgment module may also be done in response to any of the examples of problem or performance detection techniques set forth in block 1110. Adding a judgment module always helps make a module easier to interpret and helps highlight difficult-to-handle data. In some embodiments, computer system 200 may routinely add a judgment module to a network even when no training problem has been detected.

The example corrective action set forth by block 1122 will be discussed below.

Another example approach to detecting performance issues with the parent network and/or modules thereof that can be utilized by computer system 200 is to determine whether the a module has reached a point or slow or stationary learning, as set forth in block 1112. In one embodiment, computer system 200 can execute block 1112 in block 114 of the process illustrated in FIG. 1. In block 1112, the computer system 200 can determine whether a module has reached a point or slow or stationary learning by comparing auxiliary data for a datum during one epoch to the corresponding data for the same datum in preceding epochs. If the learned parameters of a module change little from one epoch to another, but the magnitudes of the partial derivatives of the error-loss function are non-negligible, that might be an indication of a problem in the training. Fortunately, it is a correctable problem. The lack of change from one epoch to another is an indication that the changes in the learned parameters summed over all the updates in an epoch is close to zero or, in other words, that the magnitude of the gradient estimates averaged over the full epoch, which is approximately equal to the true gradient, is close to zero. This situation will occur when the current learned parameter values are at or close to a stationary point in the gradient descent process. However, if the magnitude of the estimated gradient for a single datum is non-negligible, it indicates an opportunity for corrective action using the illustrative embodiment represented by block 1122.

One example corrective action that can be utilized by computer system 200 when a module is at a point of slow or stationary learning is to partition the data for the modules, as set forth in block 1122. In one embodiment, computer system 200 can execute block 1122 in block 115 of the process illustrated in FIG. 1. In block 1122, computer system 200 partitions the current data stream into two or more disjoint subsets by clustering the data based on the direction of the estimated gradient of the error-loss function for the parent network with respect to learned parameters of the current module for each individual datum in the current data stream. Since the current datum has an estimated gradient with non-negligible magnitude but the estimated gradient for the epoch as a whole has negligible magnitude, there must be other data for which the direction of the gradient is substantially different from the direction for the current datum so that the average over the epoch can have a magnitude close to zero. After clustering the data steam into two or more subsets for which the directions of the estimated gradients are substantially different from each other, computer system 200 makes a new copy of the module for each subset of the data stream and trains each copy on its associated subset of the data stream. Since the gradient directions are different, the copies of the newly created copies of the module will train to diverge from each other. In some embodiments, computer system 200 organizes the new copies of the module into an ensemble, adds a combining network such as the combining networks shown in FIG. 9, and replaces the current module with a new module comprising the ensemble of diverged copies of the current module and the combining network. The illustrative embodiment of block 1122 may be used as a corrective action for the problems detected by blocks 1111 and 1112, as well as other problems. More details about network splitting based on gradient direction as in the embodiment of block 1122 can be found in PCT Application No. PCT/US2018/035598, filed Jun. 1, 2018, entitled DATA SPLITTING BY GRADIENT DIRECTION FOR NEURAL NETWORKS, which is incorporated herein by reference in its entirety.

As noted above, the corrective action set forth by block 1122 can also be utilized by computer system 200 when an output node of a module is outputting an error or a close call.

Blocks 1113 and 1114 are illustrative embodiments of techniques that may detect training problems that are specific to a single module, but that are not specific to a single datum. Either one or both of blocks 1113 and 1114 can be performed in block 114 of the process illustrated in FIG. 1, for example.

In block 1113, computer system 200 detects potential problems in training by observing better performance on a given test set when the current module is trained on a different stream of training data than the current data stream. This symptom may be an indication of overfitting the training data.

In block 1114, computer system 200 detects potential problems in the training by observing for successive updates in the learned parameters a trend of degrading performance on a development test set that is greater than the update-to-update random performance fluctuations. This symptom may also be an indication of over fitting the training data.

In some embodiments, computer system 200 may (e.g., at step 115 of the process illustrated in FIG. 1) use the corrective actions set forth by block 1123 and/or block 1124 in response to detecting performance issues using the techniques set forth in block 1113 and/or block 1114.

In block 1123, computer system 200 performs module-specific early stopping for the current module. That is, computer system 200 halts the updating of the learned parameters of the current module. Unlike early stopping of conventional stochastic gradient descent on the whole network, with module-specific early stopping there are other modules in the parent network that may continue to be updated. Therefore, the context for the current module may change. In some embodiments, the module-specific early stopping implemented by computer system 200 in block 1123 may be temporary. In some embodiments, computer system 200 may intermittently check the current module to see if the conditions causing the need for early stopping have changed. If so, updating of the learned parameters of the current module may be resumed.

In addition to the remedies shown in FIG. 11, in some embodiments computer system 200 may use other remedies that may be well-known to those skilled in the art of training neural networks. One of those remedies is to increase regularization. There are various types of regularization used in training neural networks. A property that they tend to have in common is that regularization imposes restrictions on the learned parameters and reduces the effective number of degrees of freedom in the learned parameters, which in turn reduces the tendency for the training process to overfit the training data.

One example technique for applying regularization can include soft-tying across the modules of the network, as set forth in block 1124. Block 1124 is an illustrative embodiment of a form of regularization that is unique to a network comprising one or more modules for which there are multiple versions of the module trained in different contexts, which is a situation that is allowed in the embodiment illustrated by FIG. 1. In one embodiment, in block 1124 computer system 200 applies regularization in the form of a penalty term added to the error-loss function that, for each learned parameter, is proportional to the magnitude of the difference between the value of the learned parameter for the current version of the module and the value of the same learned parameter averaged across all other versions of the current module trained in other contexts.

Another example approach to detecting performance issues with the parent network and/or modules thereof that can be utilized by computer system 200 is to analyze whether the performance of the network and/or modules thereof is degraded for a data stream that includes a selected datum as compared to a data stream that lacks the selected datum, as set forth in block 1115. The technique of block 1115 can be utilized by computer system 200 to detect a problem in training that may be specific to a single datum. In one embodiment, computer system 200 can execute block 1115 in block 114 of the process illustrated in FIG. 1. In block 1115, computer system 200 compares the performance on a development test set using one or more pairs of training data streams where a specific training datum is included in one member of each pair of data streams and is not included in the other member of the pair. If computer system 200 detects degraded performance for training on the data streams that include the select datum, it is an indication of a problem related to the specific datum. In some embodiments, computer system 200 continues testing with other test sets, other data stream pairs and/or other modules trained on the same data to verify that there is a problem with the specific datum and to study the scope of the problem.

One example corrective action that can be utilized by computer system 200 when there is an issue with a particular datum is to modify the manner in which the datum is treated by the network and/or modules thereof, as set forth in block 1125. In one embodiment, computer system 200 can execute block 1125 in block 115 of the process illustrated in FIG. 1. In some embodiments, in block 1125, computer system 200 deletes the specific datum from the set of training data. In some embodiments, computer system 200 continues to include the specific datum, but trains with a weighted average of the training data using a reduced weight for the specific datum. In some embodiments, computer system 200 changes the training label for the specific datum.

Figure 12:
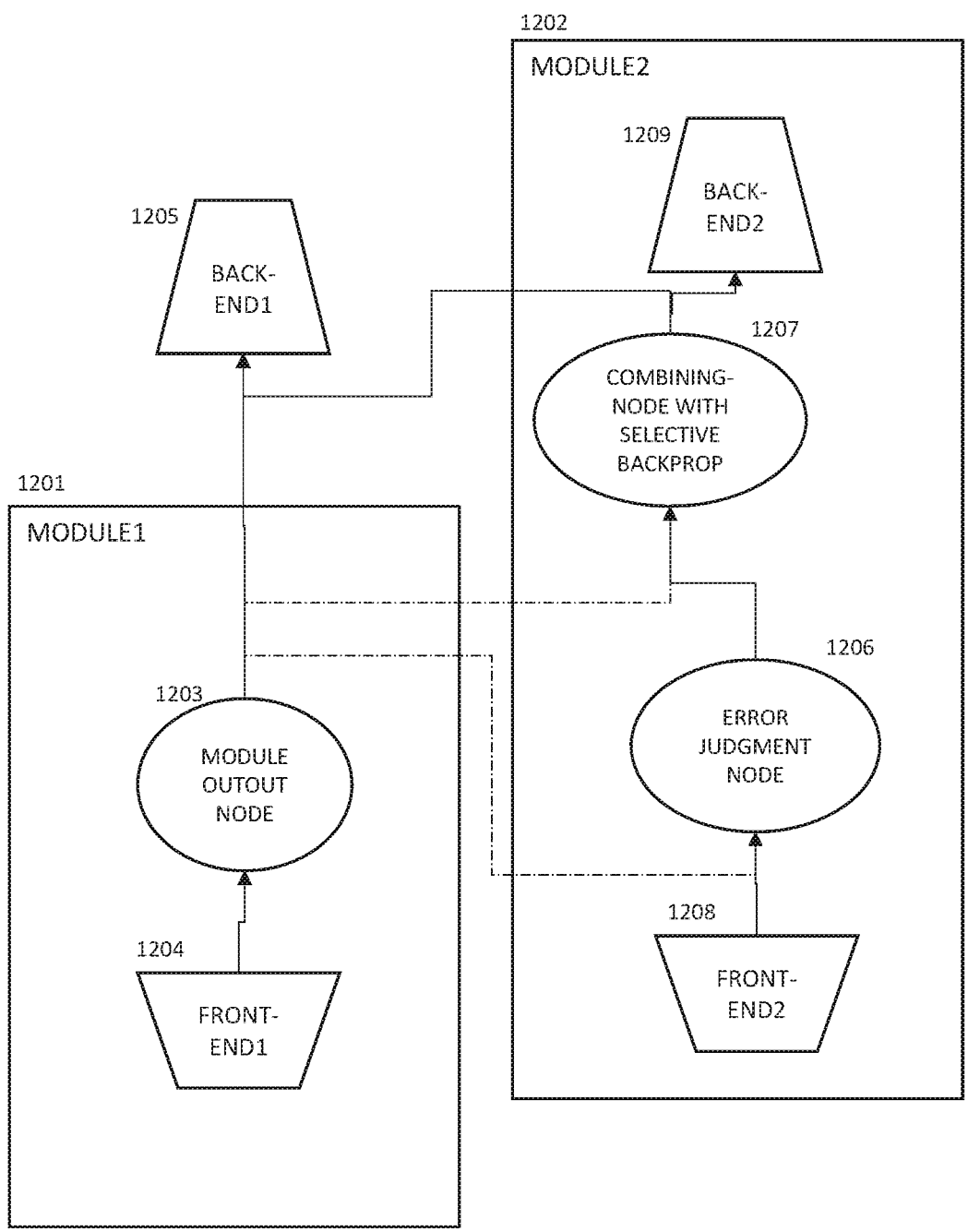
FIG. 12 is a diagram of an illustrative embodiment of an aspect of the invention using an error judgment module.

FIG. 12 is a block diagram of an illustrative embodiment of a technique that may be used to improve the performance of any neural network, and which is used in some embodiments of block 1121 of FIG. 11. The technique also makes the neural network easier to understand and interpret.

In the particular example of this technique shown in the block diagram of FIG. 12, a first module 1201 is a classifier that makes at least one error on a module-specific objective. In an embodiment of block 1121 of FIG. 11, first module 1201 is the current module being trained in an embodiment of FIG. 1.

Node 1203 is an output node with respect to first module 1201 and may be an output node of the parent network of first module 1201 or may be connected to the output of the parent network by way of a back-end module such as module 1205. The parent network of first module 1201 may comprise additional nodes and connections that are not shown in the diagram.

Second module 1202 is a new module to be created by computer system 200 during the process illustrated in FIG. 12. Second module 1202 comprises an error judgment node 1206, a combining node 1207 and, optionally, additional network elements such as front-end module 1208 and back-end module 1209. A machine learning system embodying an error judgment node is described in further detail in U.S. Provisional Patent Application Ser. No. 62/891,610, filed Aug. 26, 2019, and PCT Application No. PCT/US20/43885, filed Jul. 28, 2020, both entitled "DEEP LEARNING WITH JUDGMENT," and both of which are incorporated herein by reference in their entirety.

Error judgment node 1206 is a binary discrimination node to be trained to discriminate data on which module output node 1203 is correct from data on which module output node 1203 makes an error. For example, it may have a monotonic activation function and a threshold value for which any activation below the threshold represents the logic value FALSE and any activation above the threshold represents the logic value TRUE. Combining node 1207 may be connected to the output of the parent network of module 1201 either directly or indirectly by way of a back-end module such as module 1205 or module 1209.

Error judgment node 1206 and combining node 1207 are trained by a process that violates the normal back-propagation computation in stochastic gradient descent. Error judgment node 1206 is to be trained to discriminate data on which node 1203 makes an error from data on which node 1203 does not make an error. Although called an "error judgment" node, in some embodiments with a change in threshold, node 1206 may discriminate data on which node 1203 makes an error or has a close call from data on which node 1203 does not make and error or have a close call.

Although node 1203 has a feed forward connection to combining node 1207 and optionally has a feed forward connection to error judgment node 1206, computer system 200 intervenes in the corresponding back-propagation computation of partial derivatives of the error-loss function. In particular, computer system prevents back propagation to node 1203 from combining node 1207 or error judgment node 1206. This interruption of the back-propagation process causes the training of error judgment node 1206 to be very different from normal back propagation based training. Any node that is trained by normal back propagation training is not an error judgment node in the sense defined here. To be an error judgment node in the sense defined here, there can be no back propagation from the result of the judgment to the node being judged.

The connection weights from the error judgment node 1206 to combining node 1207 do not require training. They may be initialized and permanently set to values, by the computer system 200, that have the effect that the output of combining node 1207 has the value that accepts the output of 1206 as always being correct. That is, if the output of error judgment node 1206 is TRUE, then the output of combining node 1207 should agree with the output of node 1203, but if the output of error judgment node 1206 is FALSE, then the output of combining node 1207 should be the reverse of the output of node 1203. For example, if node 1203 has a sigmoid activation function or is a member of a softmax node set, and if activation function of error judgment node 1206 has the range [0, 1], the activation function of combining node 1207 might be defined as act(node 1207)=1−|act(node 1203)−act(node 1206)|.

The illustrative embodiment breaks the normal rules for stochastic gradient descent training and has several strange properties: (a) the activation function of combining node 1207 treats the output of judgment node 1206 as if it is always correct; (b) the formula for back propagation to node 1203 is violated; and (c) the illustrative example of an activation function for combining node 1207 is symmetric with respect to the outputs of nodes 1203 and 1206.

However, in the illustrative embodiment, module 1202, with error judgment node 1206 and combining node 1207, has several beneficial properties: (1) it directly corrects one or more errors; (2) it makes the network easier to understand and interpret; (3) it provides a form of introspection to the network; and (4) it does not disturb the normal training of node 1203.

Property number (4), that the addition of module 1202 to the network does not disturb the normal training of node 1203, helps in understanding the need for the strange properties in the illustrative embodiment of module 1202. Property (4) allows judgment node 1206 to judge node 1203 without causing the well-known observer effect: "the act of observing a system changes the behavior of the system being observed."

The strange property (a), that the activation function of combining node 1207 treats the output of judgment node 1206 as if it is always correct, can be understood by examining the role of combining node 1207 relative to judgment node 1206. Combining node 1207 is not modeling or predicting the behavior of judgment node 1206, so treating the output of judgment node 1206 as if it is always correct is not intended as a model and thus is not an incorrect model. In the back-propagation computation, the only role of combining node 1207 is to back propagate to judgment node 1206 the defining objective for a judgment node: judgment node 1206 is to be trained to discriminate data on which node 1203 is correct from data on which node 1203 makes an error. In this role, back propagating the consequence of treating the output of node 1206 as if it is always correct is merely an act of holding judgment node 1206 fully responsible for any of its errors in judgment.

The symmetric activation function of combining node 1207, which gives the correct back propagation for training error judgment node 1206 in the illustrative embodiment, with normal back propagation, would instead produce unstable, unreliable training for both node 1203 and error judgment node 1206. Each node would be trying to agree with the other node when the desired output is TRUE and would be trying to disagree with the other node when the desired output is FALSE. Agreeing when the desired combined output is TRUE is fine and causes no problem during training, but trying to disagree when the desired combined output is FALSE is much harder than merely knowing that the answer is FALSE. The training would be unstable as each node tries to guess what the other node will do and neither node would be training toward its assigned task. In addition to making the training much more difficult, it would make the output of each node unpredictable and impossible to interpret. This disastrous consequence is the opposite of the benefits obtained when an error judgment node is implemented as in the illustrative embodiment. It is an additional reason for designing combining node 1207 to break the rules of normal back propagation.

In one illustrative embodiment, when a module such as second module 1202 is to be added to a network, the new module 1202 is at first trained as a stand-alone system using the training data for the parent network of first module 1201 and retrieving the activation of node 1203 for each training datum from the history of recorded auxiliary data. Then a new expanded network is built adding second module 1202 to the parent network of first module 1201. The resumed training of the expanded network may be done by the embodiment illustrated in FIG. 1, the auxiliary data history comprising the history of the training of the original parent network of first module 1201 and comprising the history of the stand-alone training of second module 1202. This illustrative embodiment also completes the description of step 1121 of FIG. 11.

The present invention is, therefore, directed to, in one general aspects, computer systems and computer-implemented methods for training a parent neural network, where the parent neural network comprises a plurality of network modules, including a first network module that comprises one or more nodes. In one embodiment, the method comprises, by a computer system, iteratively training the parent neural network over N iterations, where N is greater than one. In such a method, training the parent neural network in the Nth iteration comprises (i) storing auxiliary data from an iteration prior to the Nth iteration, where the auxiliary data comprises datum-specific data for datum in a training dataset for the parent neural network; and (ii) training the first network module in the Nth iteration, where training the first network module in the Nth iteration comprises: (a) determining whether a first training tactic should be implemented for the first network module for a first datum in the training dataset based on the auxiliary data for the first datum; and (b) implementing the first training tactic upon a determination that the first training tactic should be implemented. The computer system comprises one or more processor cores and memory in communication with the one or more processor cores. The memory stores computer instructions (e.g., software) that when executed by the one or more processor cores, cause the processor cores to perform the methods.

In various implementations, training the first network module in the Nth iteration comprises: determining probabilistically whether a second training tactic should be implemented for the first network module for a second datum in the training dataset; and implementing the second training tactic upon a determination that the second training tactic should be implemented. Also, the N iterations may comprise N epochs, such that the auxiliary data comprises data from epochs prior to the Nth epoch and the determination of whether to implement the first training tactic for the first network module for the first datum in the Nth epoch is based on datum-specific data from an epoch prior to the Nth epoch. The first training tactic may comprise skipping training the first network module with the first datum in the Nth epoch. Determining whether to skip training of the first network module with the first datum in the Nth epoch can be based on: an estimate that a change in output of the first network module will be less than a threshold value for the first datum relative to an amount of change in other network modules of the parent neural network; whether the first network module has a stable extreme activation for the first datum for epochs prior to the Nth epoch; whether the parent neural network has a stable output for the first datum for epochs prior to the Nth epoch; and/or a magnitude of a partial derivative of an error-loss function for the parent neural network with respect to an output of the first network module.

In various implementations, the first training tactic comprises computing forward propagation activation values for the first network module for the first datum in the Nth iteration but not computing back-propagation values for the first network module for the first datum in the Nth iteration.

In various implementations, the parent network is trained in iterations prior to the Nth iteration according to a parent network objective function and the first training tactic comprises determining whether to use a first network module-specific objective function for training the first network module in the Nth iteration.

In various implementations, the method further comprises, by the computer system, determining the first network module-specific objective function.

In various implementations, the method further comprises training, by the computer system, the first network module as a standalone network with a local objective prior to the Nth iteration; and determining whether to use a first network module-specific objective function for training the first network module in the Nth iteration comprises determining whether to use the local objective.

In various implementations, each network module comprises a connected subnetwork of the parent neural network, wherein each subnetwork comprises one or more nodes and one or more arcs.

In various implementations, the parent neural network comprises a second network module and the method further comprises training the second network module in the Nth iteration. Training the second network module in the Nth iteration comprises: determining whether a second training tactic should be implemented for training the second network module for a second datum in the training dataset based on the auxiliary data for the second datum; and implementing the second training tactic for training the second network module for the second datum upon a determination that the second training tactic should be implemented. Also, the N iterations may comprise N epochs, such that the auxiliary data comprises data from epochs prior to the Nth epoch. In that case, the determination of whether to implement the first training tactic for the first network module for the first datum in the Nth epoch can be based on datum-specific data for the first datum from an epoch prior to the Nth epoch; and the determination of whether to implement the second training tactic for the second network module for the first datum in the Nth epoch can be based on datum-specific data for the second datum from an epoch prior to the Nth epoch. Also, the first training tactic can comprise skipping training the first network module with the first datum in the Nth iteration; and the second training tactic can comprise skipping training the second network module with the second datum in the Nth iteration. Still further, the steps of training the first and second network modules can be performed simultaneously by the computer system. For example, the computer system can comprise a first set of one or more processor cores and a second set of one or more processor cores. In such an implementation, the first set of one or more processor cores can train the first network module and the second set of one or more processor cores can train the second network module. Still further, the N iterations can comprise N epochs, such that the auxiliary data comprises data from epochs prior to the Nth epoch. In such an implementation, the determination of whether to implement the first training tactic for the first network module for the first datum in the Nth epoch can be based on datum-specific data for the first datum from an epoch prior to the Nth epoch; the determination of whether to implement the second training tactic for the second network module for the first datum in the Nth epoch can be based on datum-specific data for the second datum from an epoch prior to the Nth epoch; the first training tactic can comprise skipping training the first network module with the first datum in the Nth iteration; and the second training tactic comprises skipping training the second network module with the second datum in the Nth iteration.

In various implementations, the first network module comprises a front-end module, a back-end module or a hidden layer module of the parent neural network. The first network module can comprise a non-neural network machine learning system. In various implementations, training a front-end first network module in the Nth iteration can comprise training the front-end first network module in the Nth iteration using a training method other than stochastic gradient descent. In various implementations, the first network module comprises one or more nodes, and each of the one or more nodes of the first network module are on a same layer of the parent neural network. In various implementations, the parent network module comprises a plurality of layers and the first network modules comprises at least: a first node on a first layer of the parent network; and a second node on a second layer of the parent network.

In various implementations, the plurality of network modules of the parent network comprises a configuration of network modules, such that the configuration comprises: a first set of two or more front-end modules, where the computer system selects members of the first set from a first collection of three of more front-end modules; and a second set of two or more back-end modules, where the computer system selects members of the second set from a second collection of three of more back-end modules.

In various implementations, the computer system comprises a learning coach computer system. In such implementations, the method can further comprise testing, by the learning coach computer system, different configurations for the parent network on training data. In other such implementations, the method further comprises selecting, by the learning coach computer system, the members of the first and second sets based on performance of the front-end modules in the first collection and of the back-end modules in the second collection on development data.

In various implementations, the first training tactic comprises: adding a node, such as an error judgement node, to the first network module; removing a node from the first network module; splitting the first network module into multiple network modules; splitting the data in the training dataset into a plurality of disjoint datasets and training each of the network modules of the parent network module with a respective one of the disjoint datasets; increasing regularization for the training of the first network module in the Nth iteration; modifying a manner in which the first datum is treated by the first network module in the Nth iteration; and/or dropping the first datum from the training dataset.

In various implementations, the auxiliary data comprises: an activation value from an N-1th iteration for at least one of the one or more nodes of the first network submodule for the first datum; an activation value, for the first datum, from an N-1th iteration for a node of the parent neural network that provides an input to the first network submodule; an estimated activation value for the first datum from an N-1th iteration of a source node in the parent network that is a source for a node in the first network module; a value of a partial derivative of an error-loss function of the parent neural network computed during an N-1th iteration with respect to an activation value of an output node of the first network module for the first datum; an estimated partial derivative value of an error-loss function of the parent neural network computed during an N-1th iteration with respect to a weight of a directed arc from a node in the first network module that is a source node for another node in the parent neural network; and/or an estimate of variability for datum-specific data.

In various implementations, the plurality of network modules comprises a plurality of front-end modules, a plurality of back-end modules, and the first network module is one of the plurality of front-end modules. In such an implementation, the plurality of front-end modules can comprise a plurality of feature detector front-end modules; and the plurality of back-end modules can comprise a plurality of classifier back-end modules. Still further, the parent neural network can further comprise a feature vector hidden layer between the plurality of feature detector front-end modules and the plurality of classifier back-end modules, where the feature vector hidden layer comprises a plurality of feature nodes. The parent neural network may further comprise one or more interface modules between the plurality of feature detector front-end modules and the plurality of classifier back-end modules. The front-end modules may comprise object detector front-end modules and/or event detector front-end modules. The back-end modules may comprises a softmax back-end module, an ontology back-end module, a mereology back-end module, and/or a back-end recurrent network module.

In various implementations, the parent neural network comprises: a plurality of ensemble members; one or more combining networks; and
the first network module is one of the plurality of ensemble members or one of the one or more combining networks.

In another general aspect, the present invention is directed to computer-implemented methods that comprise: training a target machine learning system; training an imitation machine learning system to have the output of the imitation machine learning system match an output of the target machine learning system on each data item in a set of training data items, where the imitation machine learning system has a different machine learning architecture than the target machine learning system; and after training the imitation machine learning system, evaluating performance of the imitation machine learning system of testing data items that were not used to train the imitation machine learning system, where evaluating the performance of the imitation machine learning system comprises comparing an output of the imitation machine learning system to an output of the target machine learning system on the testing data items. The computer system comprises one or more processor cores and memory in communication with the one or more processor cores. The memory stores computer instructions (e.g., software) that when executed by the one or more processor cores, cause the processor cores to perform the methods.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. Further, it is to be understood that the figures and descriptions of the present invention have been simplified to illustrate elements that are relevant for a clear understanding of the present invention, while eliminating, for purposes of clarity, other elements. While various embodiments have been described herein, it should be apparent that various modifications, alterations, and adaptations to those embodiments may occur to persons skilled in the art with attainment of at least some of the advantages. The disclosed embodiments are therefore intended to include all such modifications, alterations, and adaptations without departing from the scope of the embodiments as set forth herein.

What is claimed is:

1. A method of training a parent neural network, wherein the parent neural network comprises a plurality of network modules and a plurality of nodes, including a first network module that comprises one or more nodes and a second network module that comprises one or more nodes, wherein both the first network module and the second network module are different subsets of the parent neural network, the method comprising, by a computer system:
    iteratively training, by a programmed computer system that comprises multiple graphical processing units (GPUs) and a data store, through machine learning, the parent neural network over N iterations, where N is greater than one, wherein each of the N iterations comprises a plurality of training data items, wherein each of the training data items comprises a vector of numerical values, and wherein the training comprises, for each of the N iterations:
        a forward computation, for each of the plurality of training data items for the iteration through the parent neural network in which activation values for each of the plurality of nodes are computed, wherein an activation value for each of the plurality of nodes is computed based on an activation function for the node;
        a back-propagation of partial derivatives of an objective function through the parent neural network; and
        an update of learned parameters for the parent neural network based on accumulation of estimates of the partial derivatives of the objective function summed over the plurality of training data items, wherein the learned parameters are parameters of the activation functions for the plurality of nodes; and
    wherein a first set of one or more GPUs of the computer system's multiple GPUs process the forward computations and back-propagations for the first network module, and a second set of one or more GPUs of the computer system's multiple GPUs process the forward computations and back-propagations for the second network module, and
    wherein iteratively training the parent neural network in the Nth iteration further comprises:
        storing, in the data store, auxiliary data from an iteration prior to the Nth iteration, wherein the auxiliary data comprises datum-specific data for training data items in a training dataset for the parent neural network, wherein the datum-specific data comprise an activation value from an (N-n)th iteration for at least one of the plurality of nodes of the parent neural network for the training data items in the training dataset, where n is greater than or equal to one, and less than N; and
        training the first network module in the Nth iteration, wherein training the first network module in the Nth iteration comprises, for each of the training data items in the training dataset:
            determining whether training of the first network module should be skipped based on the activation value from the (N-n)th iteration stored in the auxiliary data for the training data item; and
            skipping training of the first network module on the training data item upon a determination that the training of the first network module should be skipped and irrespective of whether the second network module is trained on the training data item.

2. The method of claim 1, wherein training the first network module in the Nth iteration comprises:
    determining probabilistically whether training of the first network module should be skipped for the training data items.

3. The method of claim 1, wherein the N iterations comprise N epochs, such that the auxiliary data comprises data from epochs prior to the Nth epoch and the determination of whether to skip training of the first network module for training data items in the Nth epoch is based on datum-specific data from an epoch prior to the Nth epoch.

4. The method of claim 3, wherein determining whether to skip training of the first network module for each of the training data items in the Nth epoch is based on an estimate that a change in output of the first network module will be less than a threshold value for the training data item relative to an amount of change in the second network module of the parent neural network for the training data item.

5. The method of claim 3, wherein determining whether to skip training of the first network module for each of the training data items in the Nth epoch is based on whether the first network module has a stable extreme activation for the training data item for epochs prior to the Nth epoch.

6. The method of claim 3, wherein determining whether to skip training of the first network module for each of the training data items in the Nth epoch is based on whether the parent neural network has a stable output for the training data item for epochs prior to the Nth epoch.

7. The method of claim 3, wherein determining whether to skip training of the first network module for each of the training data items in the Nth epoch is based in part on a magnitude of a partial derivative of an error-loss function for the parent neural network with respect to an output of the first network module for the training data item.

8. The method of claim 1, further comprising computing forward propagation activation values for the first network module for the plurality of training data items in the Nth iteration but not computing back-propagation values for the first network module for the plurality of training data items in the Nth iteration.

9. The method of claim 1, wherein:
iteratively training the parent neural network comprises training the parent neural network in iterations prior to the Nth iteration according to a parent network objective function; and
training the first network module in the Nth iteration using a first network module-specific objective function for training the first network module in the Nth iteration.

10. The method of claim 9, further comprising, by the computer system, determining the first network module-specific objective function.

11. The method of claim 1, wherein each network module comprises a connected subnetwork of the parent neural network, wherein each subnetwork comprises one or more nodes and one or more arcs.

12. The method of claim 1, wherein:
iteratively training the parent network comprises training the second network module in the Nth iteration, wherein training the second network module in the Nth iteration comprises:
determining whether training of the second network module should be skipped for each of the training data items in the training dataset based on the activation values from the (N-n)th iteration stored in the auxiliary data for the training data item; and
skipping training of the second network module on the training data item upon a determination that the training of the second network module should be skipped irrespective of whether the first network module is trained on the training data item.

13. The method of claim 12, wherein:
the N iterations comprise N epochs, such that the auxiliary data comprises data from epochs prior to the Nth epoch;
the determination of whether to skip training of the first network module for training data items in the Nth epoch is based on datum-specific data for the training data items from an epoch prior to the Nth epoch; and
the determination of whether to skip training of the second network module for training data items in the Nth epoch is based on datum-specific data for the training data items from an epoch prior to the Nth epoch.

14. The method of claim 12, wherein the steps of training the first and second network modules are performed simultaneously by the computer system.

15. The method of claim 1, wherein the first network module comprises a front-end first network module of the parent neural network.

16. The method of claim 15, wherein training the front-end first network module in the Nth iteration comprises training the front-end first network module in the Nth iteration using a training method other than stochastic gradient descent.

17. The method of claim 1, wherein the first network module comprises a back-end module of the parent neural network.

18. The method of claim 1, wherein the first network module comprises a hidden module of the parent neural network.

19. The method of claim 1, wherein each of the one or more nodes of the first network module are on a same layer of the parent neural network.

20. The method of claim 1, wherein:
the parent neural network comprises a plurality of layers; and
the first network module comprises at least:
a first node on a first layer of the parent neural network; and
a second node on a second layer of the parent neural network.

21. The method of claim 1, wherein the plurality of network modules of the parent neural network comprises a configuration of network modules, wherein the configuration comprises:
a first set of two or more front-end modules, wherein the computer system selects members of the first set from a first collection of three of more front-end modules; and
a second set of two or more back-end modules, wherein the computer system selects members of the second set from a second collection of three of more back-end modules.

22. The method of claim 21, wherein:
the computer system comprises a learning coach computer system; and
the method further comprises testing, by the learning coach computer system, different configurations for the parent neural network on training data.

23. The method of claim 21, wherein:
the computer system comprises a learning coach computer system; and
the method further comprises selecting, by the learning coach computer system, the members of the first and second sets based on performance of the front-end modules in the first collection and of the back-end modules in the second collection on development data.

24. The method of claim 1, further comprising adding a node to the first network module for the Nth iteration.

25. The method of claim 24, wherein the node added to the first network module comprises an error judgement node.

26. The method of claim 1, further comprising removing a node from the first network module for the Nth iteration.

27. The method of claim 1, further comprising splitting the first network module into multiple network modules for the Nth iteration.

28. The method of claim 1, further comprising:
splitting the data in the training dataset into a plurality of disjoint datasets; and
training each of the network modules of the parent neural network with a respective one of the disjoint datasets.

29. The method of claim 1, further comprising increasing regularization for the training of the first network module in the Nth iteration.

30. The method of claim 1, wherein the auxiliary data comprises an activation value from the (N-n)th iteration for at least one of the one or more nodes of the first network module for the training data items in the training dataset.

31. The method of claim 1, wherein the auxiliary data comprises an activation value, for the training data items, from the (N-n)th iteration for a node of the parent neural network that provides an input to the first network module.

32. The method of claim 1, wherein the auxiliary data comprises an estimated activation value for each training data item from the (N-n)th iteration of a source node in the parent neural network that is a source for a node in the first network module.

33. The method of claim 1, wherein the auxiliary data further comprises an estimate of variability for datum-specific data.

34. The method of claim 1, wherein:
the plurality of network modules comprises:
  a plurality of front-end modules; and
  a plurality of back-end modules; and
the first network module is one of the plurality of front-end modules.

35. The method of claim 34, wherein:
the plurality of front-end modules comprises a plurality of feature detector front-end modules; and
the plurality of back-end modules comprises a plurality of classifier back-end modules.

36. The method of claim 35, wherein the parent neural network further comprises a feature vector hidden layer between the plurality of feature detector front-end modules and the plurality of classifier back-end modules, wherein the feature vector hidden layer comprises a plurality of feature nodes.

37. The method of claim 35, wherein the parent neural network further comprises one or more interface modules between the plurality of feature detector front-end modules and the plurality of classifier back-end modules.

38. The method of claim 37, wherein the front-end modules comprise object detector front-end modules.

39. The method of claim 37, wherein the front-end modules comprise event detector front-end modules.

40. The method of claim 37, wherein the plurality of back-end modules comprises a softmax back-end module.

41. The method of claim 37, wherein the plurality of back-end modules comprises an ontology back-end module.

42. The method of claim 37, wherein the plurality of back-end modules comprises a mereology back-end module.

43. The method of claim 37, wherein the plurality of back-end modules comprises a back-end recurrent network module.

44. The method of claim 1, wherein:
the parent neural network comprises:
  a plurality of ensemble members; and
  one or more combining networks; and
the first network module is one of the plurality of ensemble members or one of the one or more combining networks.

45. A computer system for training a parent neural network, wherein the parent neural network comprises a plurality of network modules and a plurality of nodes, including a first network module that comprises one or more nodes and a second network module that comprises one or more nodes, wherein both the first network module and the second network module are different subsets of the parent neural network, the computer system comprising:
a data store;
multiple GPUs; and
a memory in communication with the multiple GPUs, wherein in the memory stores computer instructions that when executed by the multiple GPUs cause the multiple GPUs to iteratively train, through machine learning, the parent neural network over N iterations, where N is greater than one, wherein each of the N iterations comprises a plurality of training data items, wherein each of the training data items comprises a vector of numerical values, and wherein the computer instructions, when executed by the multiple GPUs, cause the multiple GPUs to train the parent neural network via iterative training that comprises, for each of the N iterations:
  a forward computation, for each of the plurality of training data items for the iteration through the parent neural network in which activation values for each of the plurality of nodes are computed, wherein an activation value for each of the plurality of nodes is computed based on an activation function for the node;
  a back-propagation of partial derivatives of an objective function through the parent neural network; and
  an update of learned parameters for the parent neural network based on accumulation of estimates of the partial derivatives of the objective function summed over the plurality of training data items, wherein the learned parameters are parameters of the activation functions for the plurality of nodes, such that a first set of one or more GPUs of the multiple GPUs process the forward computations and back-propagations for the first network module, and a second set of one or more GPUs of the multiple GPUs process the forward computations and back-propagations for the second network module; and
wherein the computer instructions, when executed by the multiple GPUs, further cause the multiple GPUs to train the parent neural network by:
  storing auxiliary data in the data store from an iteration prior to the Nth iteration, wherein the auxiliary data comprises datum-specific data for training data items in a training dataset for the parent neural network, wherein the datum-specific data comprise an activation value from an (N-n)th iteration for at least one of the plurality of nodes of the parent neural network for the training data items in the training dataset, where n is greater than or equal to one, and less than N; and
  training, by the first set of one or more GPUs, the first network module in the Nth iteration by, for each of the training data items:
    determining whether training of the first network module should be skipped based on the activation value from the (N-n)th iteration stored in the auxiliary data for the training data item; and
    skipping training of the first network module on the training data item upon a determination that the training of the first network module should be skipped and irrespective of whether the second network module is trained on the training data item.

46. The computer system of claim 45, wherein the N iterations comprise N epochs, such that the auxiliary data comprises data from epochs prior to the Nth epoch and the determination of whether to skip training of the first network module for training data items in the Nth epoch is based on datum-specific data from an epoch prior to the Nth epoch.

47. The computer system of claim 45, wherein determining whether to skip training of the first network module for training data items in the Nth epoch is based on an estimate that a change in output of the first network module will be less than a threshold value for the training data items relative to an amount of change in other network modules of the parent neural network.

48. The computer system of claim 45, wherein determining whether to skip training of the first network module-for training data items in the Nth epoch is based on whether the first network module has a stable extreme activation for the training data items for epochs prior to the Nth epoch.

49. The computer system of claim 45, wherein determining whether to skip training of the first network module for training data items in the Nth epoch is based on whether the parent neural network has a stable output for the training data items for epochs prior to the Nth epoch.

50. The computer system of claim 45, wherein determining whether to skip training of the first network module for training data items in the Nth epoch is based in part on a magnitude of a partial derivative of an error-loss function for the parent neural network with respect to an output of the first network module.

51. The computer system of claim 45, wherein the multiple GPUs are programmed further to compute forward propagation activation values for the first network module for the training data items in the Nth iteration but not computing back-propagation values for the first network module for certain training data items in the Nth iteration.

52. The computer system of claim 45, wherein the multiple GPUs are configured:
to train the parent neural network in iterations prior to the Nth iteration according to a parent network objective function; and
to train the first network module with a first network module-specific objective function in the Nth iteration.

53. The computer system of claim 45, wherein:
the second set of one or more GPUs are further configured to train the second network module in the Nth iteration by, for each of the training data items in the training dataset:
determining whether training of the second network module should be skipped based on the activation value from the (N-n)th iteration stored in the auxiliary data for the training data item; and
skipping training of the second network module on the training data item upon a determination that the training of the second network module should be skipped and irrespective of whether the first network module is trained on the training data item.

54. The computer system of claim 53, wherein:
the N iterations comprise N epochs, such that the auxiliary data comprises data from epochs prior to the Nth epoch;
the first set of one or more GPU are configured to determine whether to skip training of the first network module for the training data items in the Nth epoch based on datum-specific data for the training data items from an epoch prior to the Nth epoch; and
the first set of one or more GPU are configured to determine whether to skip training the second network module for the training data items in the Nth epoch based on datum-specific data for the training data items from an epoch prior to the Nth epoch.

55. The computer system of claim 53, wherein the steps of training the first and second network modules are performed simultaneously by the computer system.

56. The computer system of claim 45, wherein the plurality of network modules of the parent neural network comprises a configuration of network modules, wherein the configuration comprises:
a first set of two or more front-end modules, wherein the computer system selects members of the first set from a first collection of three of more front-end modules; and
a second set of two or more back-end modules, wherein the computer system selects members of the second set from a second collection of three of more back-end modules.

57. The computer system of claim 56, wherein:
the computer system comprises a learning coach computer system; and
the learning coach computer system is configured to test different configurations for the parent neural network on training data.

58. The computer system of claim 56, wherein:
the computer system comprises a learning coach computer system; and
the learning coach computer system is configured to select the members of the first and second sets based on performance of the front-end modules in the first collection and of the back-end modules in the second collection on development data.

59. The computer system of claim 45, wherein the first set of one or more GPUs is configured to add a node to the first network module in the Nth iteration.

60. The computer system of claim 59, wherein the node added to the first network module comprises an error judgement node.

61. The computer system of claim 45, wherein the first set of one or more GPUs is configured to remove a node from the first network module in the Nth iteration.

62. The computer system of claim 45, wherein the first set of one or more GPUs is configured to split the first network module into multiple network modules in the Nth iteration.

63. The computer system of claim 45, wherein the multiple GPUs are configured to:
split the data in the training dataset into a plurality of disjoint datasets; and
train each of the network modules of the parent neural network with a respective one of the disjoint datasets.

64. The computer system of claim 45, wherein the first set of one or more GPUs is configured to increase regularization for the training of the first network module in the Nth iteration.

65. The computer system of claim 45, wherein the auxiliary data comprises an activation value from the (N-n)th iteration for at least one of the one or more nodes of the first network module for the training data items.

66. The computer system of claim 45, wherein the auxiliary data comprises an activation value, for each training data item, from the (N-n)th iteration for a node of the parent neural network that provides an input to the first network module.

67. The computer system of claim 45, wherein the auxiliary data comprises an estimated activation value for each training data item from the (N-n)th iteration of a source node in the parent neural network that is a source for a node in the first network module.

68. The computer system of claim 45, wherein the auxiliary data further comprises an estimate of variability for datum-specific data.

69. The computer system of claim 45, wherein:
the plurality of network modules comprises:
a plurality of front-end modules; and
a plurality of back-end modules; and
the first network module is one of the plurality of front-end modules.

70. The computer system of claim 69, wherein:
the plurality of front-end modules comprises a plurality of feature detector front-end modules; and the plurality of back-end modules comprises a plurality of classifier back-end modules.

71. The computer system of claim 70, wherein the parent neural network further comprises a feature vector hidden layer between the plurality of feature detector front-end modules and the plurality of classifier back-end modules, wherein the feature vector hidden layer comprises a plurality of feature nodes.

72. The computer system of claim 70, wherein the parent neural network further comprises one or more interface modules between the plurality of feature detector front-end modules and the plurality of classifier back-end modules.

73. The computer system of claim 72, wherein the front-end modules comprise object detector front-end modules.

74. The computer system of claim 72, wherein the front-end modules comprise event detector front-end modules.

75. The computer system of claim 72, wherein the plurality of back-end modules comprises a softmax back-end module.

76. The computer system of claim 72, wherein the plurality of back-end modules comprises an ontology back-end module.

77. The computer system of claim 72, wherein the plurality of back-end modules comprises a mereology back-end module.

78. The computer system of claim 72, wherein the plurality of back-end modules comprises a back-end recurrent network module.

79. The computer system of claim 45, wherein:
the parent neural network comprises:
a plurality of ensemble members; and
one or more combining networks; and
the first network module is one of the plurality of ensemble members or one of the one or more combining networks.

* * * * *